US007149975B1

(12) United States Patent
Johnson et al.

(10) Patent No.: US 7,149,975 B1
(45) Date of Patent: Dec. 12, 2006

(54) OPTICAL NETWORK ADMINISTRATION GRAPHICAL USER INTERFACE

(75) Inventors: John I. Johnson, Kinburn (CA); Tommaso M. D'Ippolito, Ottawa (CA); Blair Moxon, Kanata (CA); Sara Chen-Wing, Ottawa (CA); Fred F. Trasmundi, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 655 days.

(21) Appl. No.: 10/025,628

(22) Filed: Dec. 26, 2001

(51) Int. Cl.
*G06F 3/00* (2006.01)

(52) U.S. Cl. ............... 715/734; 715/853; 715/733; 715/735; 715/736; 709/220; 709/224; 398/33; 398/117; 398/181

(58) Field of Classification Search ........... 345/853, 345/733, 734, 735, 736, 737, 738, 748; 709/220–224; 715/969; 398/33, 177, 181
See application file for complete search history.

(56) References Cited

U.S. PATENT DOCUMENTS

| | | | | |
|---|---|---|---|---|
| 5,170,393 | A * | 12/1992 | Peterson et al. | 370/255 |
| 5,295,243 | A * | 3/1994 | Robertson et al. | 715/848 |
| 5,726,979 | A * | 3/1998 | Henderson et al. | 370/254 |
| 6,101,498 | A * | 8/2000 | Scaer et al. | 707/10 |
| 6,112,015 | A * | 8/2000 | Planas et al. | 709/223 |
| 6,278,449 | B1 * | 8/2001 | Sugiarto et al. | 715/826 |
| 6,504,646 | B1 * | 1/2003 | Amoruso | 359/341.1 |
| 6,570,867 | B1 * | 5/2003 | Robinson et al. | 370/351 |
| 6,577,595 | B1 * | 6/2003 | Counterman | 370/230 |
| 6,654,803 | B1 * | 11/2003 | Rochford et al. | 709/224 |
| 6,704,016 | B1 * | 3/2004 | Oliver et al. | 345/440.2 |
| 6,704,509 | B1 * | 3/2004 | Yang et al. | 398/34 |
| 6,728,484 | B1 * | 4/2004 | Ghani | 398/42 |
| 6,744,446 | B1 * | 6/2004 | Bass et al. | 345/734 |
| 6,981,228 | B1 * | 12/2005 | Chen et al. | 715/853 |
| 7,076,505 | B1 * | 7/2006 | Campbell | 707/104.1 |
| 7,076,739 | B1 * | 7/2006 | Yasuda | 715/769 |
| 2002/0165934 | A1 * | 11/2002 | Conrad et al. | 709/217 |
| 2002/0186432 | A1 * | 12/2002 | Roorda et al. | 359/128 |
| 2003/0030862 | A1 * | 2/2003 | Trier et al. | 359/110 |
| 2003/0103077 | A1 * | 6/2003 | Despotidis et al. | 345/734 |
| 2003/0112958 | A1 * | 6/2003 | Beaudoin | |
| 2003/0184599 | A1 * | 10/2003 | Beaudoin | |
| 2004/0081308 | A1 * | 4/2004 | Naik et al. | 379/221.07 |
| 2004/0098474 | A1 * | 5/2004 | Galou et al. | 709/223 |

OTHER PUBLICATIONS

Rea, Paul et al, Advanced Interface into Netowkr Management Workstations, 1993, IEE,pp. 7/1-3.*
Maeda, Marl, Management and Control of Transparent Optical Networks, Sep. 1998.IEEE Journal on Selected Areas in Communications, vol. 16, No. 7.*
Hibino et al, User Interface Design for SONET Networks, 1992, IEEE Communications Magazine,pp. 24-26.*

* cited by examiner

*Primary Examiner*—Sy Luu
*Assistant Examiner*—Ryan F. Pitaro

(57) ABSTRACT

This invention provides an improved graphical user interface (GUI) for optical network administration. The GUI allows a user to view a network topology in which only those nodes at which channel traffic may be added to and/or dropped from a muxed signal are displayed. The GUI also provides a view of optical components through which data is transmitted on a selected route, and a view of the individual channels which comprise the selected route. Finally, the GUI allows the user to view information relating to transmitters and receivers associated with the channel signals being transmitted along the selected route.

35 Claims, 15 Drawing Sheets

OPTICAL NETWORK ADMINISTRATION GRAPHICAL USER INTERFACE

FIELD OF THE INVENTION

This invention relates to graphical user interfaces, and in particular to graphical user interfaces to be used to assist in administering optical networks.

BACKGROUND OF THE INVENTION

As optical networks have become increasingly complex, the effective administration of such networks, including to increase efficiency and to reduce error-rates, has become more and more difficult.

Optical networks consist of a number of network elements which may generally be classed as optical components, and optical connections. Optical components process an optical signal either passively or actively, while optical connections, typically fiber-optic cables, transmit the optical signal between optical components.

Today, such optical networks are typically owned and administered by service providers who rent out capacity on the network to client users of the optical network. The administration of these networks is typically conducted by a network administrator employed by the service provider.

To assist the network administrator in viewing the status of the optical network and to identify areas of potential improvement in the performance of the network, the network administrator often makes use of a graphical user interface (GUI) operating on a computer system connected to the optical network. Information is gathered from the network elements by the computer system, and is displayed in the GUI for viewing by the network administrator. Using such GUI's, network administrators can view the status of data transmission over the optical network, improve the efficiency of the network, maximize use of the network elements, and be alerted to, and locate alarms in the network.

One useful view which is often incorporated into an optical network administration GUI is a network topology, namely a graphical representation of the geographic and/or logical structure of the network. Such topologies allow network administrators to easily and quickly understand the interaction between different network elements which form the network. However as the complexity of optical networks has increased, network topologies have become increasingly difficult to read and understand. Often, too many of the network elements making up the optical network are displayed on the network topology. The result is that the network topology becomes cluttered and it becomes very difficult to discern the important network elements and how they are connected. Another negative result is that to allow this dense network topology to be understood, only a small portion of the optical network can typically be displayed at any given time.

Another useful view commonly offered in an optical network administration GUI is an optical components view. Such a view typically displays the optical components located at a given geographic location. However, such optical components views again display too many non-relevant optical components at a given geographic location, and typically do not allow the network administrator to easily view the optical components of interest from more than one geographic location at the same time.

Further, as optical networks have advanced, specialized optical components have been developed to combine a number of individual optical signals (or "channel signals") into a single multiplexed optical signal (or "muxed signal") through such techniques as dense wave division multiplexing (DWDM). Thus, although a single optical connection in an optical network can typically only carry a single optical signal, that optical signal may be a muxed signal which has within it a number of separate channel signals which have been combined through multiplexing. Thus, in a sense, the optical connection has within it, a number of optical channels. Although present optical network administration GUI's do have the capability of displaying how optical connections, or a series of optical connections and optical components forming a route, are provisioned for data transmission, such GUI's do not allow network administrators to easily view how individual optical channels on that route have been provisioned for data transmission.

Finally, present optical network administration GUI's have not provided a simple means of viewing assigned routes of data traffic through the optical network, which are supported by a given network element. The identification of such routes is an important step in determining how an error in a given network element may affect data transmission on the network.

SUMMARY OF THE INVENTION

In a broad aspect, the present invention provides a graphical user interface (GUI) adapted to display network information for an optical network.

Upon selection of a network topology icon, the GUI displays a network topology consisting of graphical representations of nodes at which channel traffic may be added to and/or dropped from a muxed signal travelling on the optical network, as well as graphical representations of the links connecting these nodes.

Upon selection of an optical components icon and a selected route of data travel through the optical network, the GUI displays in a logical configuration, optical components through which data travels on the selected route.

Upon selection of a channel viewer icon and a selected route, the GUI displays information relating to each of a number of channels through which data is transmitted on the selected route, including which of the channels has traffic provisioned for it, and which do not.

Upon selection of a transmitters/receivers icon and a selected route, the GUI displays information relating to transmitters and receivers associated with channel signals being transmitted through the channels of the selected route.

The present invention also contemplates embodiments in which only one, two or three of the above-mentioned icons are available to be selected.

Further, the present invention also contemplates a method for implementing the GUI of the present invention, a computer-readable medium containing instructions for implementing the said method, and a computer system adapted to implement the method.

Advantageously, the present invention allows a network administrator to more easily assess how optical components of interest are connected to one another in an optical network, assess and improve the efficiency of the optical network, and to locate, and determine the effect of, alarms in the optical network.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
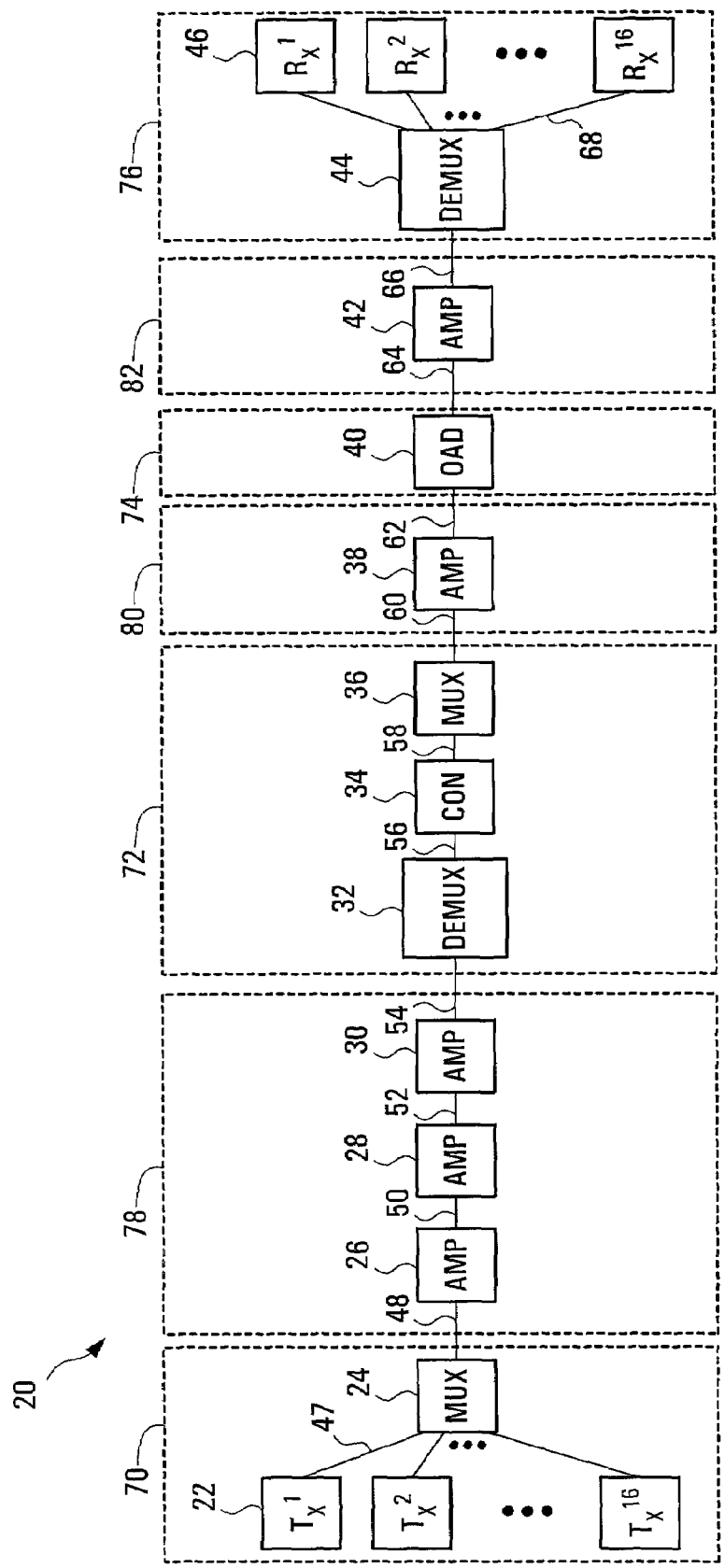
FIG. 1 is a block diagram of a simple chain of optical components and optical connections within an optical network.

Optical networks generally consist of a number of network elements, namely optical components, and optical connections. Optical components produce, manipulate, and receive optical signals, while optical connections transmit optical signals between optical components. To illustrate a structure of a typical optical network, a single chain 20 of network elements in a typical optical network is shown in FIG. 1. In this illustration, the optical components are represented by the boxes (22, 24, 26 for example), while the lines appearing between the boxes (48, 50, 52 for example) represent optical connections. A typical optical network would consist of many such chains, interconnected at various points.

In the single chain 20 shown in FIG. 1, a data stream (not shown) first enters each of a number of transmitter cards 22, and are converted by them into individual optical signals, or "channel signals". The data stream entering each of the transmitter cards 22 may have been generated using any of a number of technologies and standards, for example IP (Internet Protocol), SONET (Synchronous Optical Network), SDH (Synchronous Digital Hierarchy), or ATM (Asynchronous Transfer Mode). These channel signals are then transmitted by the transmitter cards 22 into the optical network. Each of these channel signals may have a unique wavelength associated therewith when it emerges from the transmitter card 22. Alternatively, the channel signals may subsequently pass through a wavelength translator (not shown) to have associated with it, a unique wavelength.

A number of these channel signals are then combined, or multiplexed, into a single optical signal, or a "muxed signal" by a multiplexor 24. In this case, the multiplexing of the channel signals into the muxed signal is performed using a technology known as Dense Wave Division Multiplexing, or DWDM. However, it is to be understood that this multiplexing may be performed using other technologies. Thus, the muxed signal is an optical signal which in effect carries within it a number of channel signals. Correspondingly, each of the optical connections following the multiplexor 24, until the muxed signal is demultiplexed, is capable of transmitting a muxed signal, and in effect has within it a number of logical "channels" each for transmitting a channel signal.

The muxed signal is thereafter transmitted by the optical connections 48, 50 etc. through various optical components, each of which is further described below.

First, because the strength of the muxed signal can decrease over long distances, the muxed signal is occasionally amplified in this exemplary single chain, by amplifiers 26, 28, 30, 38 and 42.

Further, some degradation of the muxed signal can also occur over long distances. As such, the muxed signal in this example is occasionally regenerated by demultiplexing the muxed signal using a demultiplexor 32, conditioning the channel signals using a conditioner 34, and remultiplexing the channel signal into a muxed signal again using a multiplexor 36.

In some cases (not shown in this example), the muxed signal can be demultiplexed into its individual channel signals, one or more channel signals added and/or removed, and then remultiplexed so as to add or remove one or more channel signals from a muxed signal. However, such adding or removing of channel signals may also be performed through purely optical means without the need to fully demultiplex or remultiplex. The technologies used to do so are well known in the optical field, and are generally called optical add/drops 40, one of which is shown in the illustrated example.

Once the muxed signal has reached its destination, the muxed signal is demultiplexed by a demultiplexor 44, and the channel signals are then received by receiver cards 46.

To simplify how an optical network may be considered or viewed, the optical components and optical connections making up the optical network may be grouped into nodes and links. A node may generally be considered to be any group of optical components and the optical connections connecting them. Such nodes may represent a group of network elements located at a particular geographic location, or may be a logical grouping for performing a particular function. In the illustrated example, the transmitter cards 22, the mutiplexor associated therewith 24 and the optical connections connecting them 47 are grouped together as a transmission node 70. The conditioner 34, and the demultiplexor 32 and remultiplexor 36 associated therewith, and the optical connections 56 and 58 connecting them are grouped together as a regeneration node 72. The receiver cards 46, the demultiplexor associated therewith 44 and the optical connections between them are grouped together as a receiver node 76. In some cases, a node may simply consist of a single optical component, as is the case with the illustrated optical add/drop 40 which forms its own optical add/drop node 74.

Similarly, a group of optical connections with certain, typically non-signal-manipulating optical components therebetween, may be grouped together to form a link. In the illustrated example, the three amplifiers 26, 28 and 30 located between the transmitter node 70 and the regeneration node 72, as well as the optical connections associated therewith 48, 50, 52 and 54 form a first link 78, the amplifier 38 located between the regeneration node 80 and the optical add/drop node 82, as well as the optical connections associated therewith 60 and 62, form a second link 80, while the amplifier 42 located between the optical add/drop node 74 and the receiver node 76, as well as the optical connections associated therewith 64 and 66 form a third link 82.

Figure 2:
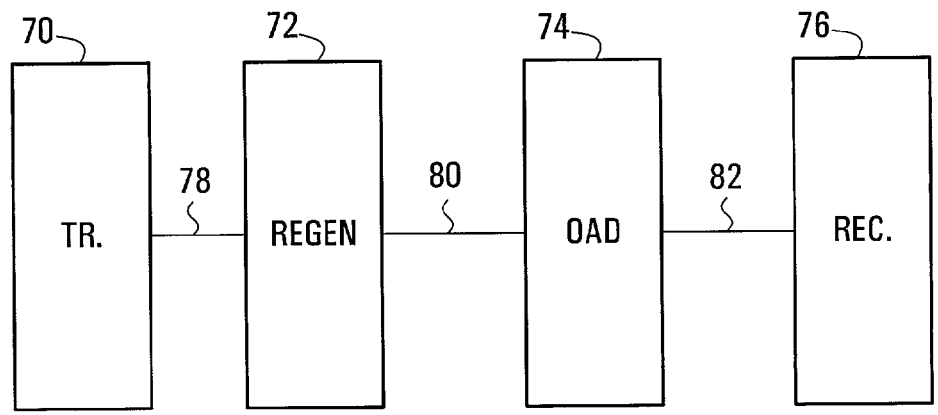
FIG. 2 is a simplified block diagram of the simple chain illustrated in FIG. 1.

Thus, the single chain illustrated in FIG. 1 may be more simply and clearly represented by showing only the nodes and the links, as shown in FIG. 2. Thus, in FIG. 2, the single chain 20 is represented by the transmitter node 70, connected by the first link 78 to the regeneration node 72, which is connected by the second link 80 to the optical add/drop node 74, which is connected by the third link 82 to the receiver node 76.

Figure 2A:
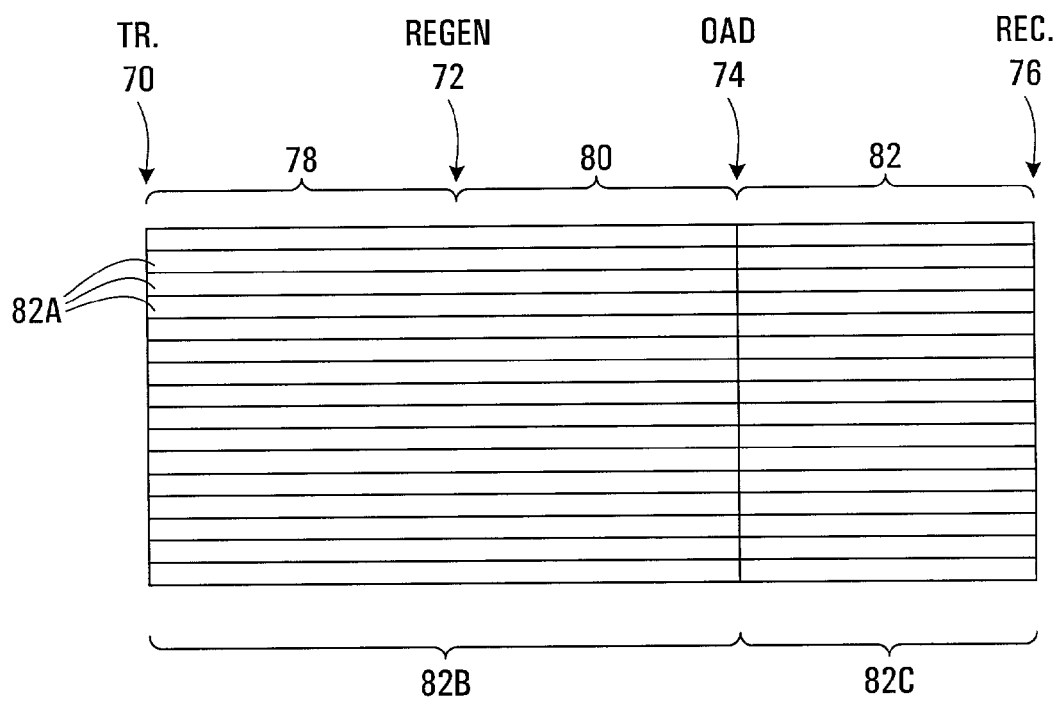
FIG. 2a is a schematic illustration of the simple chain of FIG. 1.

At times, when analyzing a given chain of optical elements, it is often useful to subdivide it along its length, into longitudinal segments. Such longitudinal segments may consist of any number of adjacent links. FIG. 2A is thus another illustration of the single chain 20 of FIGS. 1 and 2 showing the links 78, 80, 82 between the nodes 70, 72, 74, 76, the channels 82$a$ of which each of the links is comprised (in this case there are 16 such channels), as well as the longitudinal segments 82$b$ and 82$c$ into which this single chain has been subdivided along its length. In this case, the longitudinal segments 82$b$ and 82$c$ represent the set of links between those nodes at which a channel signal can be added to, or dropped from a muxed signal being transmitted along the single chain. Thus, the first longitudinal segment 82$b$ consists of the links between the transmitter node 70 and the optical add/drop node 74, and the second longitudinal segment 82$c$ consists of the link between the optical add/drop node 74 and the receiver node 76.

Although an exemplary optical network has been described above, it is to be understood that the GUI of the present invention may be used with any optical network.

An exemplary context for the application of the GUI of the present invention will now be described.

Figure 3:
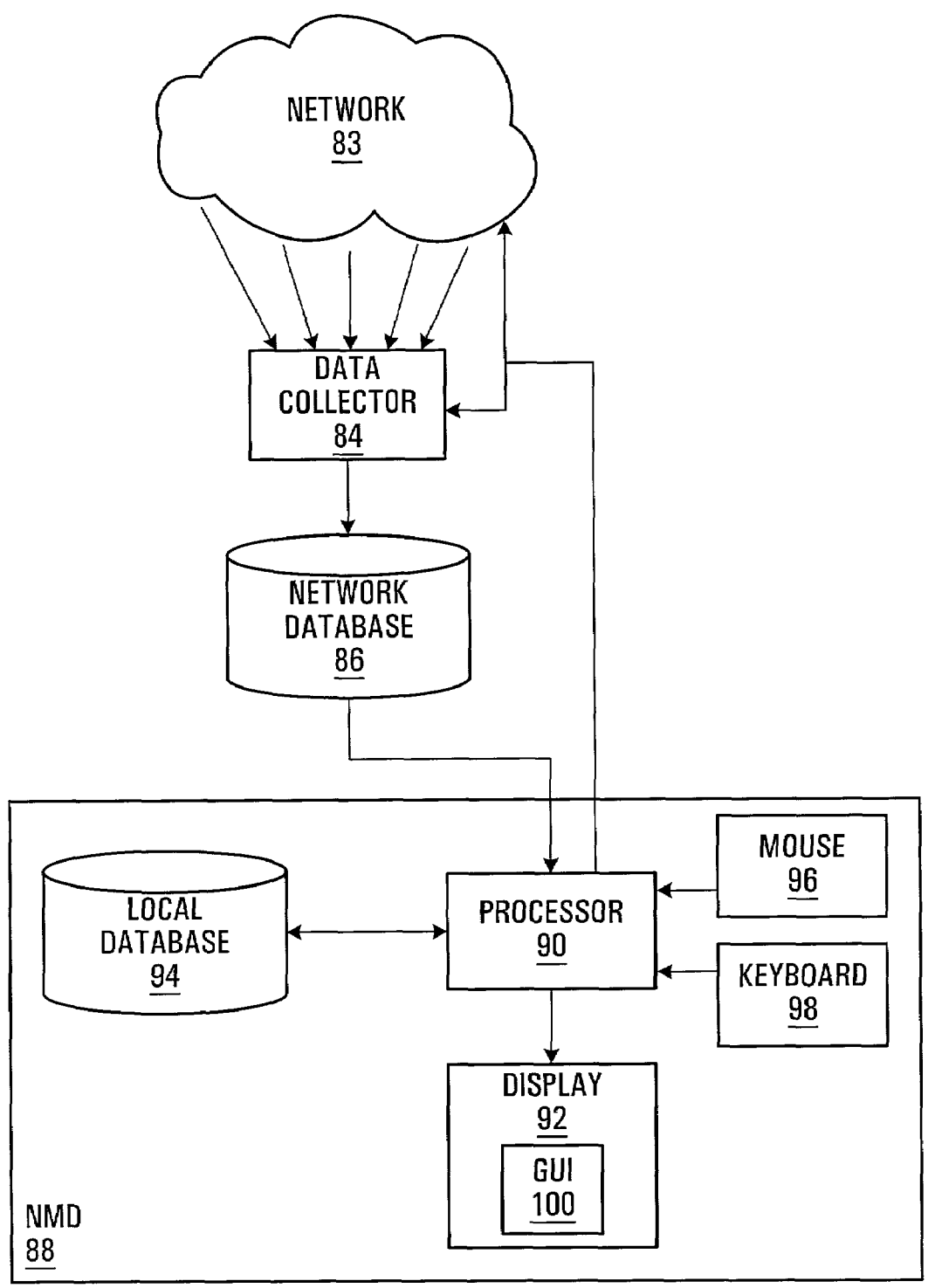
FIG. 3 is a block diagram of an optical network connected to a computer system featuring a GUI according to an embodiment of the present invention.

FIG. 3 is a block diagram of a typical computer system used by a network administrator to administer an optical network. In this illustration, the optical network 83 is connected to a data collector 84 which in turn is connected to a network database 86. The network database 86 is then connected to a network management device, or NMD 88.

The data collector 84 is capable of collecting network information from the optical network 83. Such network information may include for example, a level of traffic across network elements, or status information representing the status of various network elements contained in the optical network 83. Status information can generally only be obtained from active network elements, namely those which are capable of providing feedback. For example, at present multiplexors and amplifiers are not capable of feedback though they are expected to be so capable in the future. Status information may include any alarms which may be detected at network elements, for example where data is not being processed or transmitted properly by the network element, or indeed where data is being lost. The collection and viewing of such network information is therefore important to maintain the integrity and efficiency of the optical network 83. The manner in which the data collector 84 may collect network information from the optical network 83 is well known in the optical network field.

Upon receipt of network information from the optical network 83, the data collector 84 stores this network information in the network database 86. The network database 86 may also have stored on it architectural, technical, or identification data for various network elements, or various routes of data transmission in the optical network 83.

The NMD 88 has a network management processor 90 which is connected to a display 92, and user input devices such as a mouse 96 and a keyboard 98. If the display 92 is touch sensitive, then the display itself provides a user input device. The NMD 88 also has a local database 94. The NMD 88 is adapted to perform three functions. First, it presents a GUI 100 on the display 92 to enable the presentation of information to a network administrator in a clear and coherent manner and to enable the receipt of instructions from the network administrator through the user input devices 96, 98. Second, it processes data stored in the network database 86 as well as the local database 94, in accordance with instructions received from the network administrator through the GUI 100 to put it into a form suitable for display. Third, in some cases, the NMD 88 may request the data collector 84 to obtain certain specific information from the optical network 83. Finally, the NMD 88 may manipulate the performance of the optical network 83, for example by respecifying a different route of data transmission for a specific data stream.

Although one exemplary context for the application of the GUI 100 of the present invention has been described in detail above, it is to be understood that the GUI 100 may be used in other contexts. Notably, the computer system featuring the GUI may be any system wherein a processor is connectable to an optical network, or a database containing optical network information, and is capable of displaying graphical information and receiving user inputs.

The Preferred Embodiment GUI

The preferred embodiment GUI 100 according to the present invention will now be described with reference to FIGS. 4 through 10. Although the network administration GUI 100 may have many additional features relevant to the administration of the optical network 83, only those which are related to the present invention will be described below.

Figure 4:
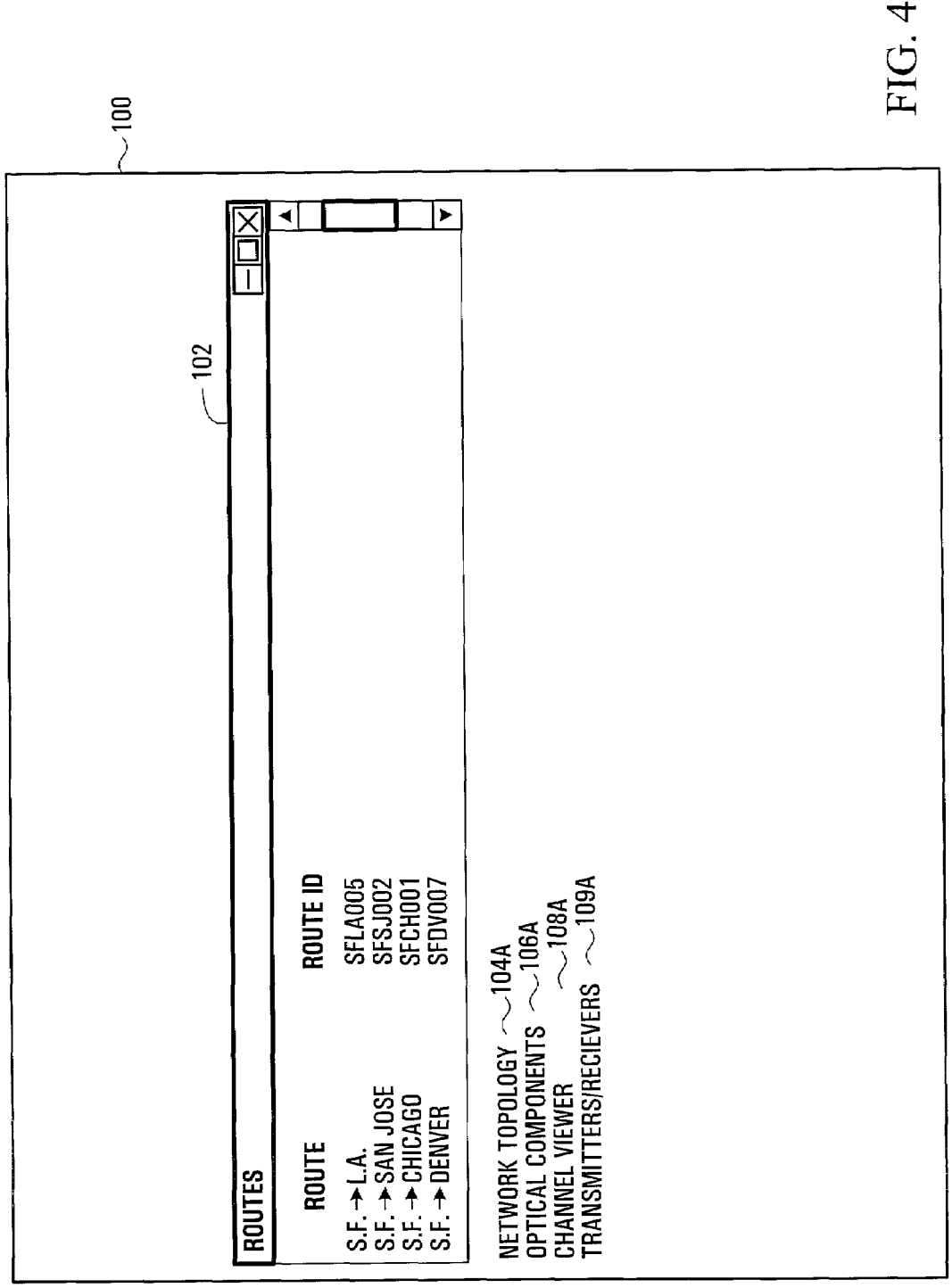
FIG. 4 is an illustration of a GUI according to an embodiment of the present invention, displaying a routes panel.

In FIG. 4, a routes panel 102 is displayed by the GUI 100, along with icons for viewing a Network Topology 104$a$, viewing Optical Components 106$a$, a Channel Viewer 108$a$, or for viewing transmitters/receivers 109$a$. These icons are illustrated as selectable text, however it is to be understood that other types of icons may be used, graphical icons for example.

The Routes Panel

With reference to FIG. 4, in the routes panel 102 is displayed information pertaining to a number of routes in the optical network 83.

A route is a predefined path of data transmission between a start node and an end node. Such routes are typically defined by the network administrator, and include the start node, the end node, and intermediate nodes and links through which data is transmitted on the route. The start node and the end node may be any two nodes in the optical network 83, as defined by the network administrator. A route may for example be an "optical line", a path taken by a channel signal, from a transmitter 22 through the optical network 83, to a receiver 46, for example for data which needs to be transmitted from a particular location in San Francisco to a particular location in New York City.

Another type of route which is commonly used by network administrators for viewing relevant portions of an optical network 83, is an amp chain, also known as a DWDM system, or an optical system. Amp chains are essentially the units into which a network administrator often divides an optical network, each of which is capable of multiplexing, transmitting, and demultiplexing an optical signal, from one point in the optical network 83 to another.

Thus, when a given channel signal needs to travel from one part of the optical network to another, in the above example from San Francisco to New York City, the channel signal may travel through a number of amp chains. For example the channel signal may first be provisioned to travel along a San Francisco—Denver amp chain, wherein the channel signal is multiplexed with other channel signals into a muxed signal in San Francisco, transmitted across the amp chain to Denver, and then demultiplexed. The channel signal may then be remultiplexed with other channel signals and transmitted on a Denver—Chicago amp chain. Finally, a third amp chain may be used to transmit the channel signal from Chicago to New York City. Amp chains therefore offer network administrators the ability to divide an optical network into logical segments, for easier viewing and analysis.

Returning to FIG. 4, the specific routes to be displayed in the routes panel 102 may be all routes which have been defined in the optical network 83, or may be some subset of these routes. For example, the routes to be displayed may be all optical lines, or all amp chains. Alternatively, the specific routes to be displayed in the routes panel 102 may be selected using filtering criteria such as by specifying a start node, a route identification number, an end node, or other characteristic. The method by which such selections may be made are well known, for example through pop-up boxes, drop-down menus, or by displaying a number of filtering criteria and allowing the network administrator to select or specify the filtering criteria to be used. In the illustrated example, the network administrator had specified certain filtering criteria, namely all routes which have a start node in San Francisco.

Alternatively, the routes to be displayed in the routes panel 102 may be selected using a network resource inventory component (not shown) of the GUI 100 which may display the nodes and/or links at which alarms have been detected. Then upon selection of a given node or link, the GUI 100 may then display in the routes panel 102, those routes which are supported by the selected node or link. Such a feature would allow the network administrator to easily view the routes which are affected by an alarm at a given node or link.

The information to be displayed for each route in the routes panel 102 may be one or more of a large number of potential route characteristics, for example an identification of the start node or the end node for the route, a route identification (as illustrated), an indication of the number of channels which may be carried by the links on the route, or the number and types of alarms which have been detected at the network elements forming the route.

The Network Topology Panel

Figure 5:
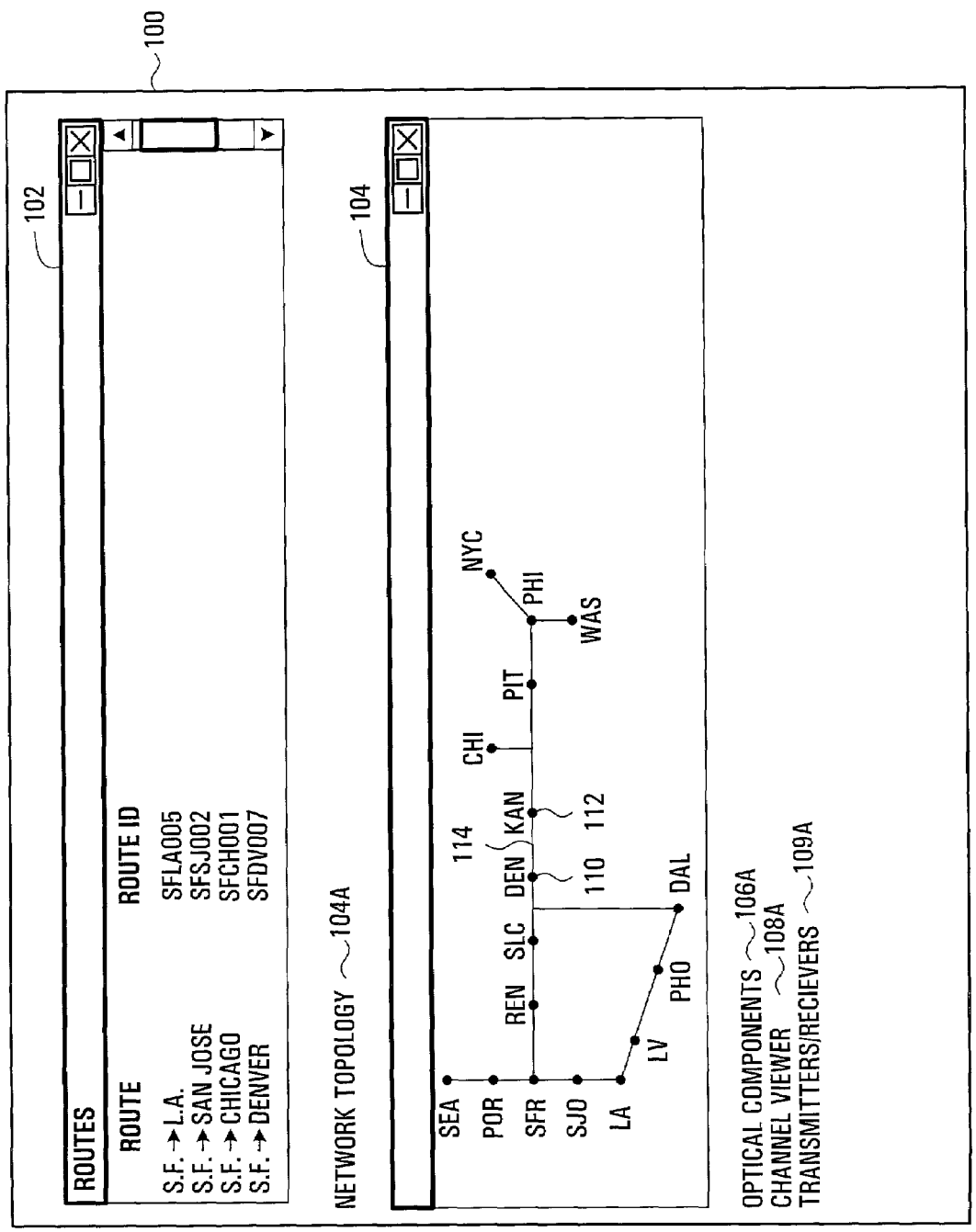
FIG. 5 is an illustration of the GUI of FIG. 4 displaying a network topology panel.

In FIG. 5, the network administrator has selected Network Topology icon 104a, and as such a network topology panel 104 has been displayed. In this network topology panel 104 is displayed a network topology of nodes and links making up the optical network 83. Such a network topology may be organized geographically, namely according to the geographic location of the nodes, or logically, for example according to a function of the nodes, or some combination of both. Of course, the network topology panel 104 may display all of the optical network 83, or only a portion thereof. Similarly, the network topology panel 104 may be limited to displaying nodes and links of a particular type.

In the illustrated example, the optical network 83 is a very complex one consisting of hundreds of nodes and thousands of links. As such, the display of all such nodes and links would result in a network topology which is either too dense to understand without great difficulty, or too large to allow the network administrator to view any more than a small portion at any given time. To solve this problem, the network topology panel 104 in the preferred embodiment GUI 100 illustrates only add/drop nodes (represented by node dots, 110 and 112 for example), namely those nodes at which a channel signal may be added to, or removed from, a muxed signal travelling across the optical network 83, and the links (represented by link lines, 114 for example) which connect such add/drop nodes. Thus, nodes such as transmitter nodes 70, receiver nodes 76, those nodes which contain an optical add/drop 40, and those at which a demultiplexing takes place, channel signals are added and/or dropped from the muxed signal, and then multiplexed again, are represented, whereas other nodes such as regeneration nodes 72, and those which contain only amplifiers, are not. Such a view greatly simplifies a network topology, and allows the network administrator to view the interconnections between, and the logical or geographic organization of only those nodes at which a channel signal may be added to or dropped from the optical network 83.

Figure 6:
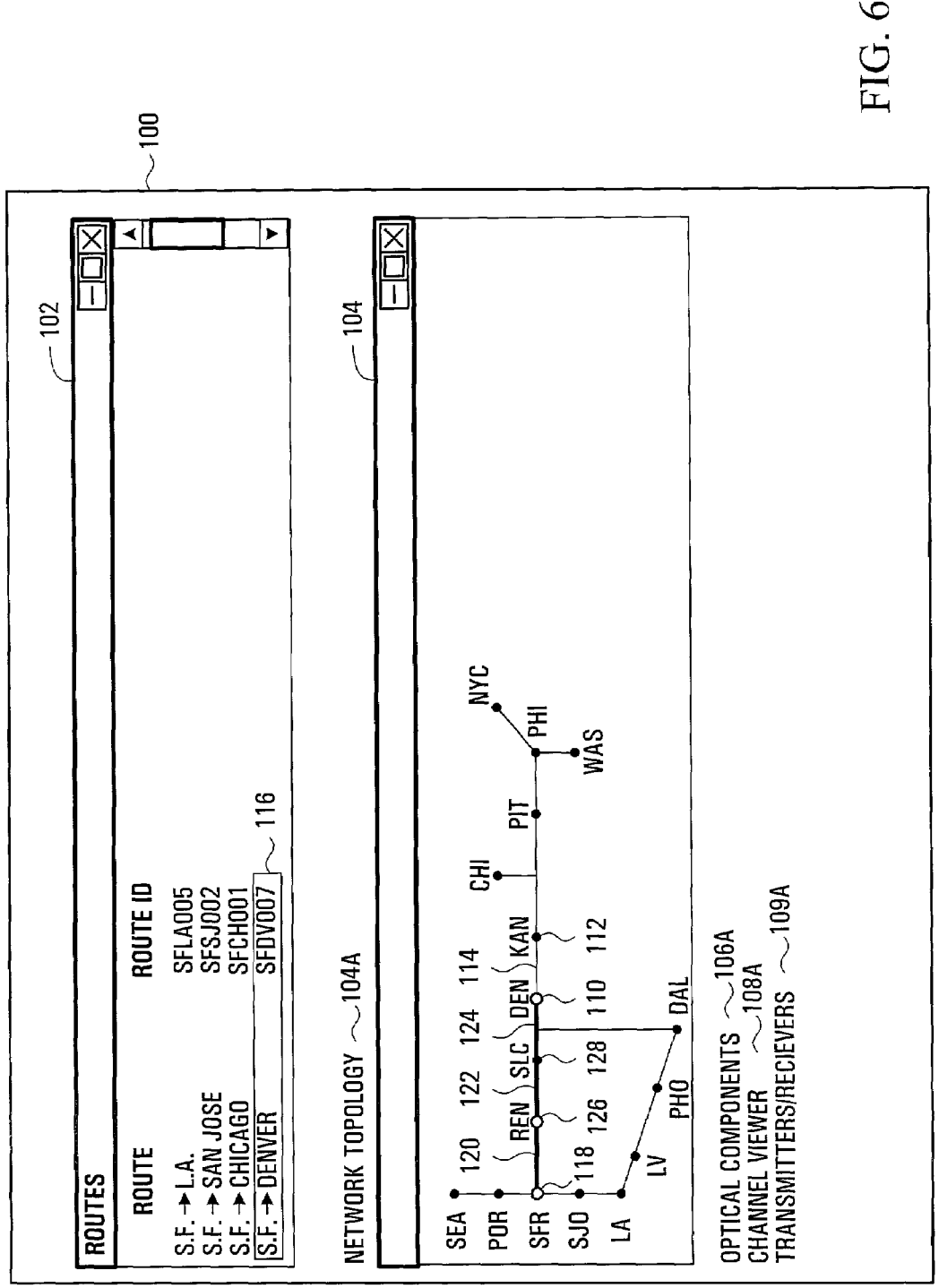
FIG. 6 is an illustration of the GUI of FIG. 5 wherein a selected route has been highlighted.

As shown in FIG. 6, upon selection of a selected route 116 in the routes panel 102, link lines representing intermediate links associated with the selected route 116 are highlighted in the network topology displayed in the network topology panel 104. In this case the selected route is the S.F.→Denver amp chain route 116, and the intermediate links are those connecting San Francisco and Reno 120, Reno and Salt Lake City 122 and Salt Lake City and Denver 124. Further, the node dots for those nodes at which a channel signal may be added to, or removed from, a muxed signal travelling on the selected route 116 are also visually distinguished, in the illustrated example, by representing the nodes as open circles, instead of dots. It is to be noted that although a given node in an optical network may allow channel signals to be added to or dropped from a muxed signal travelling on one route supported by the node, it may not allow such channel signal adding or dropping on another route supported by the node. In this case, the nodes on the selected route 116 at which a channel signal may be added to or dropped from a muxed signal travelling on the selected route 116 are the San Francisco node 118, the Reno node 126 and the Denver node 110. Although the Salt Lake City node 128 is capable of adding or removing channel signals from a muxed signal on some routes, it is not so capable on the selected route. As such, the Salt Lake City node 128 is not visually distinguished when the S.F.→Denver route 116 has been selected in the routes panel 102.

The Optical Components Panel

Figure 7:
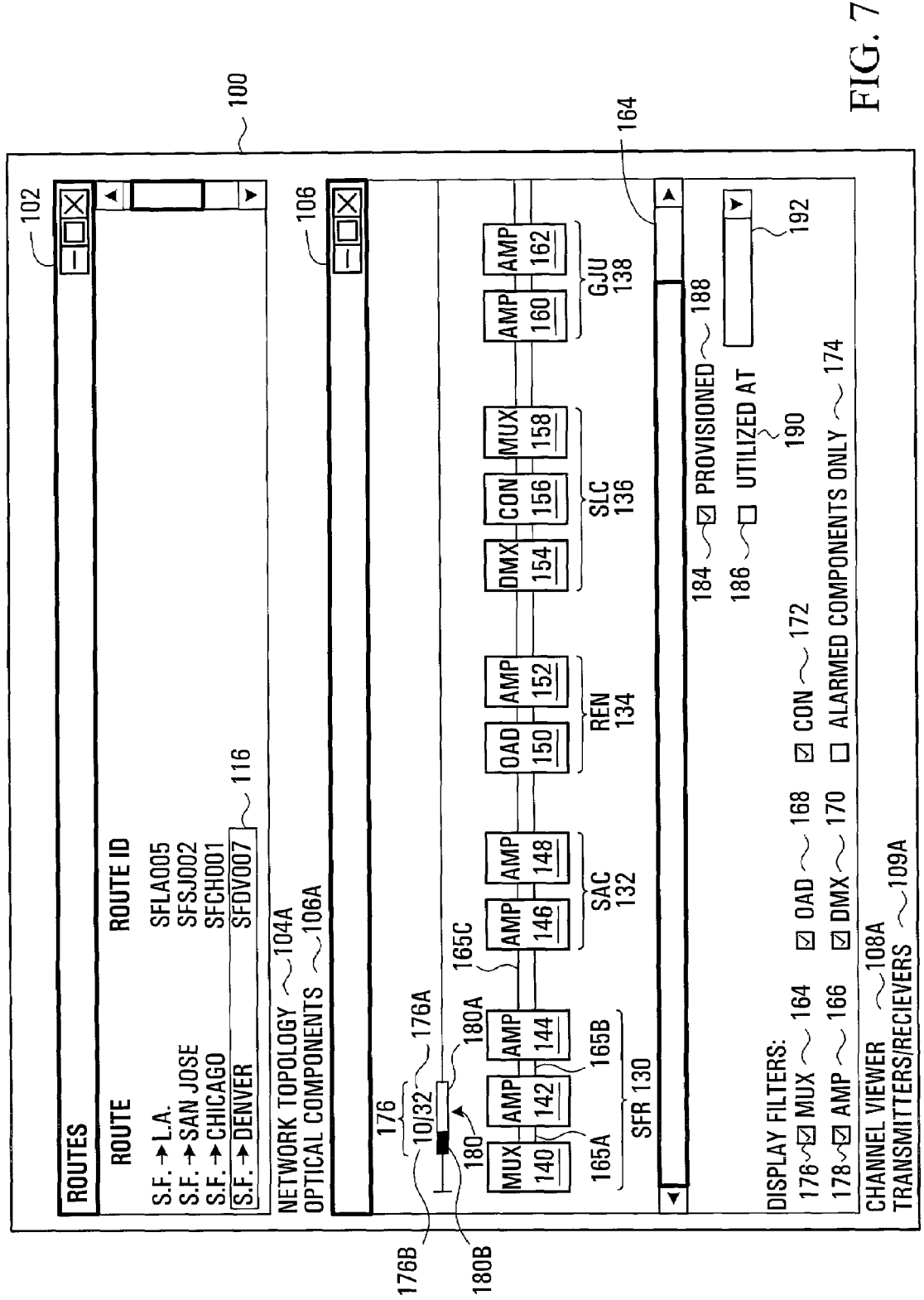
FIG. 7 is an illustration of the GUI of FIG. 4 displaying an optical components panel.

In FIG. 7, the network topology panel 104 has been minimized, and the optical components icon 106a has been selected. As such, an optical components panel 106 has been displayed, which displays information for optical components of which the nodes of the selected route 116 are composed.

The optical components panel 106 displays graphical representations (in this case boxes) of the optical components of which the nodes of the selected route 116 are comprised, in a linear representation, grouped into nodes, in the order in which an optical signal would be transmitted along the selected route 116. Although each of the nodes of the selected route 116 may have within it a large number of optical components, only those optical components through which an optical signal is transmitted on the selected route are displayed. Thus, the first node is the San Francisco node 130, which is composed of a multiplexor 140, and two amplifiers 142 and 144. Next is a Sacramento node 132 which consists only of two amplifiers 146 and 148. This is followed by the Reno node 134, consisting of an optical add/drop 150 and an amplifier 152. The Salt Lake City node 136 is a regeneration node composed of a demultiplexor 154, a conditioner 156 and a multiplexor 158. The Grand Junction node 138 consists of two amplifiers 160 and 162. Finally, if the network administrator were to manipulate the horizontal scroll bar 164 such that the remainder of the optical components on the selected route 116 were to be shown, the optical components panel 106 would then display a graphical representation of a demultiplexor (not shown) which constitutes the Denver node (not shown). Such a display of optical components allows the network administrator to easily view the optical components which make up a selected route, for the purposes of alarm location, inventory, data tracking, etc.

Briefly referring back to the network topology panel 104 shown in FIG. 6, it is to be noted that because the San Francisco, Reno, and Denver nodes on the selected route do allow channel signals to be added to or dropped from a muxed signal travelling on the selected route 116, the representations of these nodes 118, 126 and 110 are visually distinguished from the other nodes. While the Salt Lake City node is capable of adding or dropping a channel signal from a muxed signal travelling on some routes, it cannot add or drop a channel signal from a muxed signal travelling on the selected route 116, and as such although this node is displayed in the network topology panel 104, it is not visually distinguished. Finally, because the Sacramento and Grand Junction nodes are not capable of adding or dropping channel signals from a muxed signal travelling on any route, these nodes do not appear in the network topology panel 104 at all.

Returning to the optical components panel 106 displayed in FIG. 7, optionally, the graphical representations of the optical components may communicate further information regarding the optical components they represent. For example, the representations of the optical components may indicate which optical components are in an alarm state, and may further indicate the category of alarm, for example by the representations of alarmed components appearing in a distinguishing colour communicating the alarm state of the alarmed component. Also, those optical component representations which represent active optical components may be visually distinguished from those which represent passive optical components, for example by displaying a thicker outline around the optical component representations.

An optical connection graphical representation, in this case an optical connection line (165*a*, 165*b* and 165*c* for example) is also displayed between each adjacent pair of optical component graphical representations. Each optical connection line represents an optical connection between the optical components represented by the pair of adjacent optical component graphical representations between which it is displayed. Optionally, the thickness of each optical connection line may represent a relative traffic capacity of the associated optical connection.

At the bottom of the optical components panel 106 is displayed a number of optical component filtering characteristics 164, 166, 168, 170, 172 and 174, each of which is associated with a respective check box 176 and 178 for example. By selecting or deselecting one or more of these filtering characteristics, the network administrator can specify which types of optical components will be displayed in the optical components panel 106. As shown, the check boxes 176 and 178 for example, associated with each of the multiplexor 164, amplifier 166, optical add/drop 168, demultiplexor 170 and conditioner 172 filtering characteristics have been selected such that all optical components of these types are displayed in the optical components panel 106. However, if for example the network administrator were to uncheck the check box associated with the amplifier filtering characteristic 166, then the representations of the amplifiers 142, 144, 146, 148, 152, 160 and 162 would no longer be displayed in the optical components panel 106. Another optical component filtering characteristic is an alarmed components only filter characteristic 174 which, if checked, results in all optical components disappearing from the optical components panel 106 except for those which are in an alarmed state. Of course other filtering characteristics may be used.

At the top of the optical components panel 106 is an indication of a proportion of the capacity of the optical connections on the selected route 116 which have been provisioned for use, by the network administrator. In the illustrated example, this proportion is communicated by displaying above the first optical connection 165*a* in the San Francisco node 130, a first numeric proportion 176 consisting of the number 176*a* of total channels on the optical connection 165*a*, preceded by the number 176*b* of those channels which have been provisioned for use by the network administrator. This proportion is also communicated by displaying a first horizontal bar graph 180, an outline of which 180*a* represents the number of total channels on the optical connection 165*a*, while a shaded portion 180*b* thereof represents the number of channels which have been provisioned for use. In this case, the number of total channels available for traffic on this optical connection 165*a* is 32, while the number of such channels which have been provisioned for use is 10. In this example, as indicated by the line 182 extending the length of the selected route 116, this same proportion is applicable to all of the optical connections composing the selected route 116. If the proportion of the capacity of the optical connections on the selected route 116 which have been provisioned for use were to be different for different optical connections, then first multiple numeric proportions 176 and first bar graphs 180 would be displayed at appropriate locations along the length of the selected route 116.

That the top of the optical components panel 106 displays the proportion of the capacity of the optical connections on the selected route 116 which have been provisioned for use by the network administrator, is selected at the right side of the optical components panel 106 just below the horizontal scroll bar 164 by checking the check box 184 associated with the "provisioned" option 186. If the network administrator were instead to check the check box 188 associated with the "utilized at" option 190, and select in the drop down menu 192 a selected speed of transmission, then at the top of the optical components panel 106 would be displayed a proportion of the number of channels provisioned for use by users of the optical network, which have been provisioned for use at the selected speed, as shown in FIG. 8.

Figure 8:
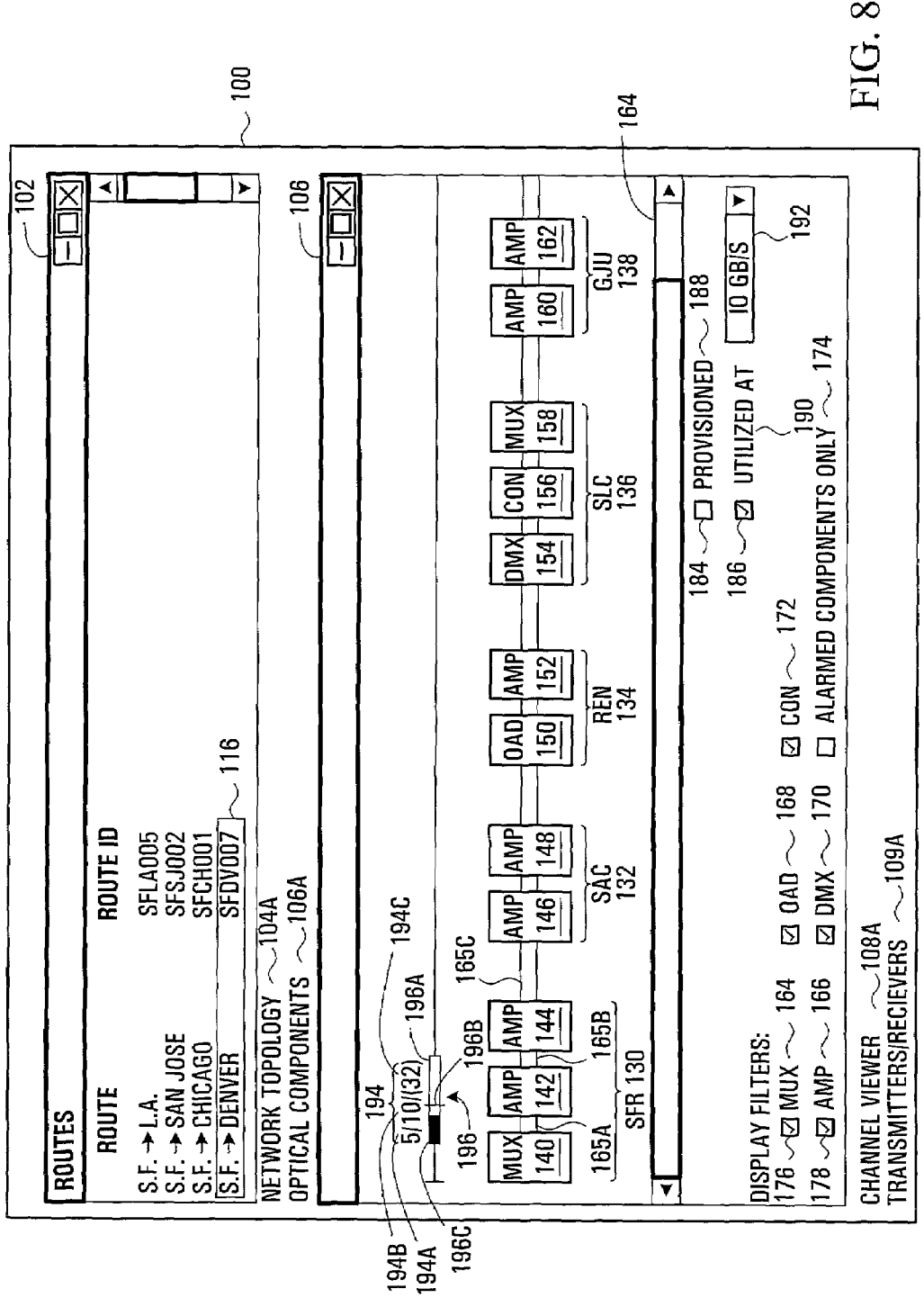
FIG. 8 is an illustration of the GUI of FIG. 7 wherein a user has selected to display an indication of a proportion of traffic provisioned to travel at a selected speed.

At the top of the optical components panel 106 in FIG. 8, the first numeric proportion 176 has been replaced by a second numeric proportion 194 which consists of three numbers, namely the number 194*a* of channels on the optical connections which have been provisioned for use at the selected speed 192 of 10 Gb/s (in this case 5), the total number 194*b* of channels which have provisioned for use (in this case 10), and the total number 194*c* of channels on the optical connection 165*a* (in this case 32). Similarly, the first bar graph 180 shown in FIG. 7 has been replaced by a second bar graph 196 which communicates the same information as the second numeric proportion 194, but in graphical form. In particular, the second bar graph 196 has an outline 196a which represents the number of total channels on the optical connection 165a, a vertical line 196b which represents the number of channels which have been provisioned for use, and a shaded area 196c which represents the number of channels which have been provisioned for use at the selected speed. Again, in this example, this same proportion is applicable to all of the optical connections composing the selected route 116, and if the proportion were to be different for different optical connections, then multiple second numeric proportions 194 and second bar graphs 196 would be displayed at appropriate locations along the length of the selected route 116.

Although the optical components panel in the illustrated preferred embodiment displays the optical components of which the selected route is composed in a linear representation in the order in which data is transmitted along the selected route, other representations may be used, non-linear representations categorized by type, for example.

Optionally, where the optical signal of interest in the selected route is a channel signal, as is the case where the selected route is an optical line, as opposed to a muxed signal, as is the case where the selected route is an amp chain, the GUI 100 may not display either the first numeric proportion 176, first horizontal bar graph 180, second numeric proportion 194, second horizontal bar graph 196, or the "provisioned" 188 or "utilized" 190 options. Further, in such a case, the thickness of the optical connection line may be only a thin line representing the single channel through which the channel signal of the optical line travels.

The Channel Viewer Panel

Figure 9:
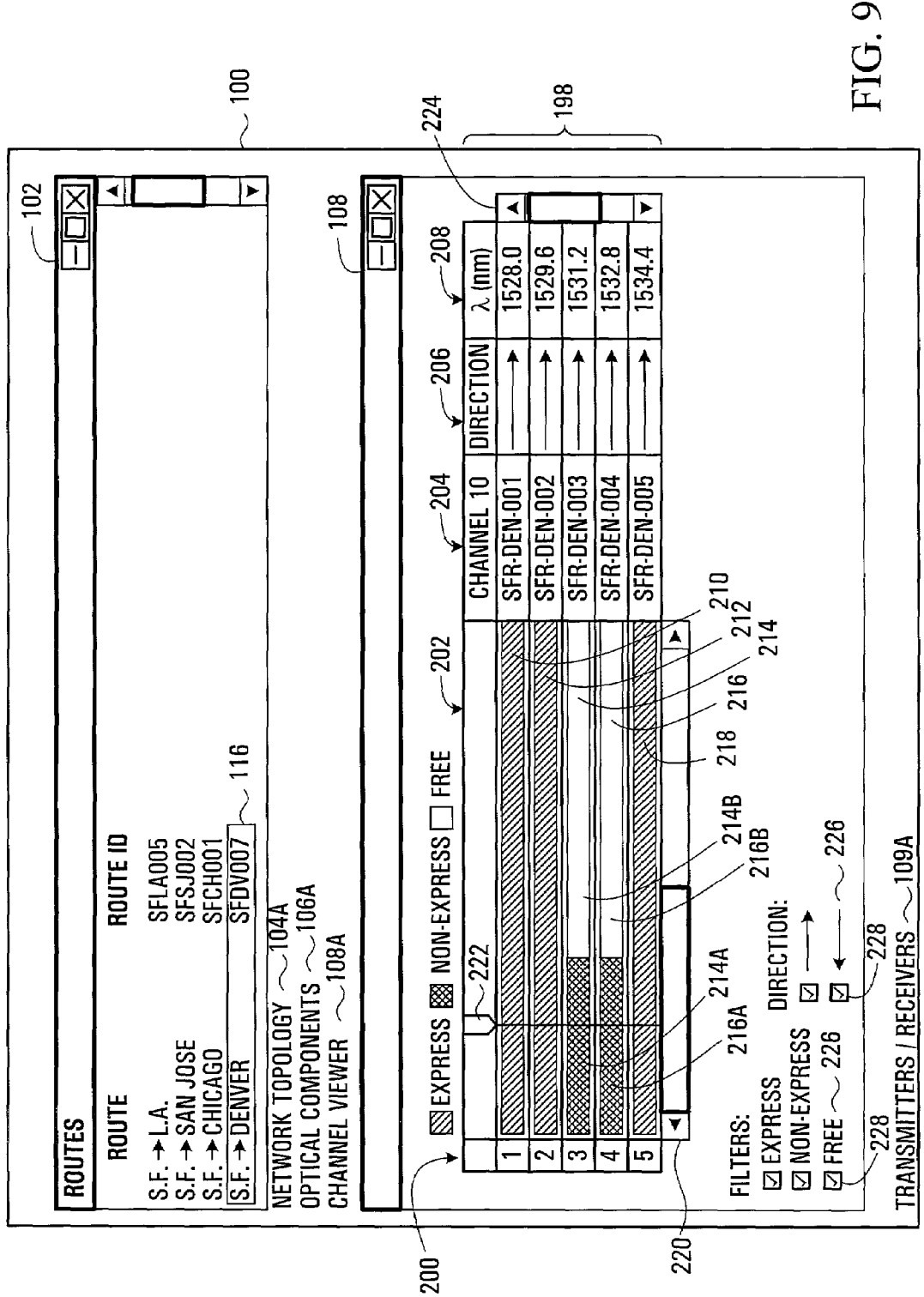
FIG. 9 is an illustration of the GUI of FIG. 4 displaying a channel viewer panel.
Figure 10:
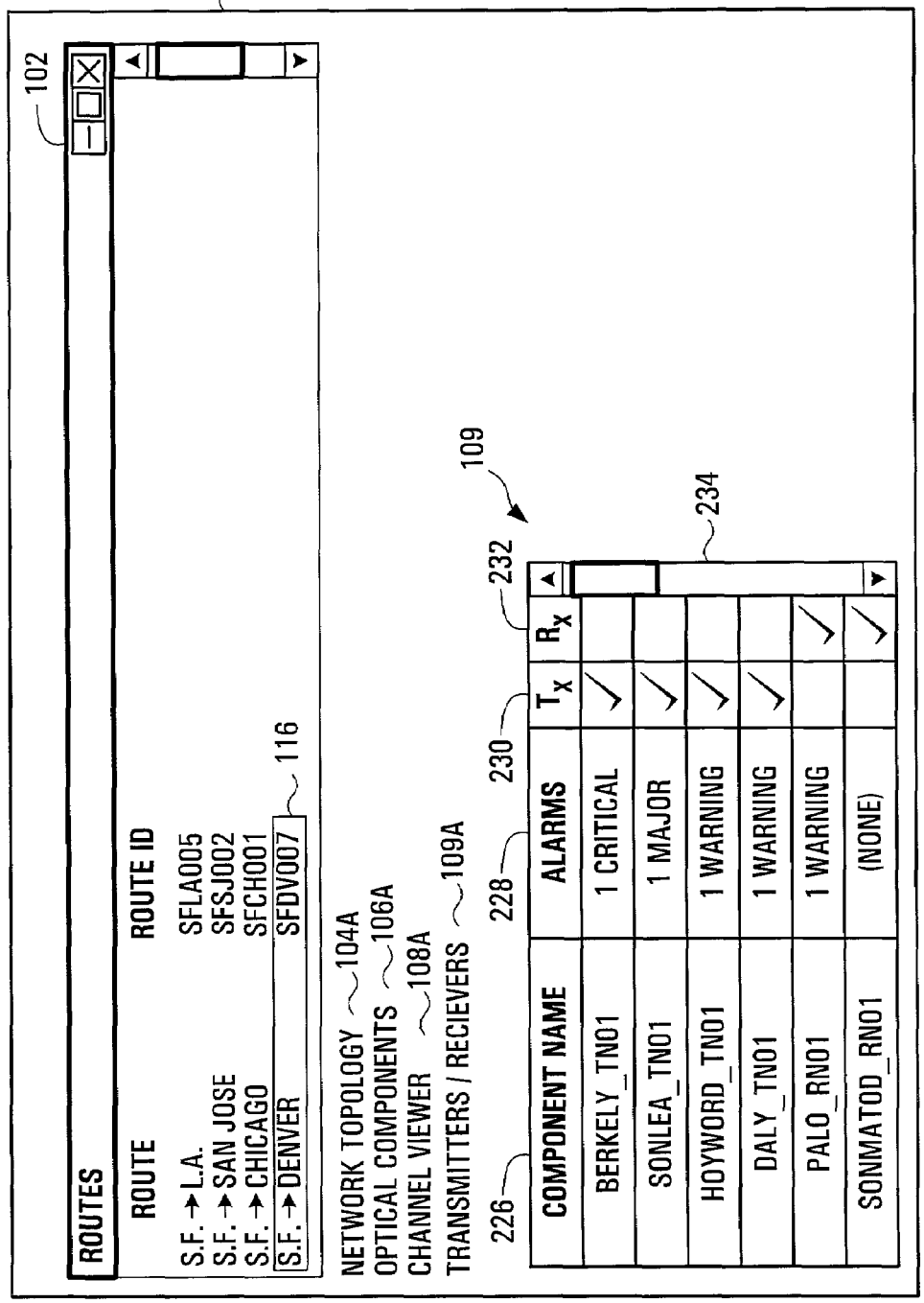
FIG. 10 is an illustration of the GUI of FIG. 4 displaying a transmitters/receivers panel.

In FIG. 9, the optical components panel 106 has been minimized, and the network administrator has selected the channel viewer icon 108a. As such, a channel viewer panel 108 has been displayed. The channel viewer panel displays a channels chart 198 providing information for each of the channels forming the links of the selected route 116.

A first column 200 of the channels chart 198 displays an identifying number for each of the channels. This number is typically pre-assigned by the network administrator for the channels of the links of the optical network 83.

In a second column 202, the channels chart 198 displays a channel bar 210, 212, 214, 216 and 218 representing each of the channels. A left end of each channel bar represents the start node of the selected route 116. A right end (not shown) of each channel bar represents the end node of the selected route 116. Distance along each channel bar between its left end and its right end represents a corresponding distance along the selected route 116 between its start node and its end node. In the illustrated example, only a first portion of each channel bar is displayed. The remainder of each channel bar may be displayed by manipulating a horizontal scroll bar 220 appearing below the second column 202.

For the purposes of displaying the channel bars in the second column 202 of the channels chart 198, each of the channels forming the links of the selected route 116 is divided into multiple longitudinal segments along the length of the channel. Each segment is terminated at its ends by a node at which a channel signal may be added to, or dropped from a muxed signal travelling along the selected route 116. Where there are no intermediate nodes at which a channel signal may be added to, or dropped from a muxed signal travelling along the selected route 116, the channels forming the links of the selected route 116 have only one longitudinal segment, namely one which is terminated at its ends by the start node and the end node.

Each of the channel bars displayed in the second column 202 communicates a traffic characteristic of the channel it represents. In the illustrated example, a hatching used within each channel bar indicates whether the channel it represents is an express channel wherein a single channel signal travels directly from the start node to the end node on the channel, a non-express channel wherein a channel signal travels on a number of longitudinal segments along the length of the channel which is less than the total number of longitudinal segments along the length of the channel, or whether the channel, or certain longitudinal segments of the channel, is free, where no data traffic is provisioned to travel along that channel, or those longitudinal segments of the channel. In the illustrated example, single hatching is used to indicate an express channel, cross-hatching is used to indicate a non-express channel, and no hatching is used to indicate where a channel is free. Thus, in this example, each of the channels identified as numbers 1, 2 and 5 in the first column 200 is represented by a respective channel bar 210, 212 and 218 which is single hatched, indicating that it is an express channel. In contrast, each of the third and fourth channels is represented by a respective channel bar 214, 216 which is double hatched for a first portion 214a, 216a, indicating that the segment or segments of these channels represented by the first portion carries non-express traffic. Each of these third and fourth horizontal bars also has a second portion 214b, 216b which has no hatching, indicating that the segment or segments of these channels represented by the second portion carries no traffic. Of course, other forms of visual identification may be used to indicate the traffic characteristic of each channel, different colours for example.

The second column 202 also includes a longitudinal slide tab 222 which may be manipulated by the network administrator to select a longitudinal position along the selected route for which the channel information in each of the third 204, fourth 206 and fifth 208 columns is displayed. For example, upon moving the longitudinal slide tab 222, the network administrator may cause the third 204, fourth 206 and fifth 208 columns to display information for different segments of the channels.

The third 204, fourth 206 and fifth 208 columns display information for each of the channels, in this case a channel identification, a direction of data traffic on the channel, and a wavelength of a channel signal travelling along the channel. Other information respecting the channels may be displayed, for example an identification of the speed of traffic on the channel. Further, other columns may be displayed, containing other information respecting each channel.

At the right end of the channels chart 198 is a vertical scroll bar 224 which allows the network administrator to view information for other channels forming the links of the selected route 116.

At the bottom of the channel viewer panel 108 is a list of filter characteristics each with associated check boxes. By checking or unchecking these filter characteristics, the network administrator can control the channels to be displayed in the channels chart 198 in much the same manner as the display filter characteristics 176, 178 etc. associated with the optical components panel 106.

Optionally, where the selected route 116 is one in which the optical signal of interest is a channel signal (as with an optical line), as opposed to a muxed signal (as with an amp chain), the GUI 100 may only display in the channel viewer panel 108, information for the single channel transmitting the relevant channel signal.

The Transmitters/Receivers Panel

In locating alarms, it is often useful to view information for transmitters 22 and receivers 46 which transmit and receive channel signals carried by the links of the selected route 116. Thus, in FIG. 10, the channel viewer panel 108 has been minimized, and the network administrator has selected the transmitters/receivers icon 109*a*. As such, a transmitters/receivers panel has been displayed.

The transmitters/receivers panel displays for each channel forming the links of the selected route 116, information for a transmitter optical component 22 and a receiver optical component 46.

In the illustrated example, the transmitters/receivers panel 109 is a chart which displays for each transmitter and each receiver for each channel forming the links of the selected route 116, a component name 226, a number and type of alarm 228 detected at the transmitter or receiver, and whether the component is a transmitter 230 or a receiver 232. Of course, other information may be displayed for each transmitter and receiver, a region name for example. A vertical scroll bar 234 is provided at the right side of the transmitter/receiver panel 109 to allow the network administrator to view information for all of the transmitters and receivers for each channel forming the links of the selected route 116.

Optionally, where the selected route 116 is one in which the optical signal of interest is a channel signal (as with an optical line), as opposed to a muxed signal (as with an amp chain), the GUI 100 may only display in the transmitters/receivers panel 109, transmitter and receiver information for the single channel transmitting the relevant channel signal.

Functionality

Having described the appearance and panel interaction of a preferred embodiment GUI 100 of the present invention, a particular example of functionality behind the operation of this preferred embodiment GUI 100 will now be described with reference to the flowcharts shown in FIGS. 11 to 15. More generally, any functionality which is capable of transforming a database of network connectivity and performance information into displays such as exemplified herein may be employed.

First, it is to be noted that the network database 86 will typically only contain dynamic information respecting the optical components forming the optical network 83. All static information is stored in the local database 94. Thus, information such as the organization of the optical network 83 into routes, the optical components, nodes, optical connections and links which make up each route, and other static information about each route, optical component, node, optical connection, link and channel is stored in the local database 94. Dynamic information such as alarm states are received by the data collector 84 from the optical network 83, and is stored in the network database 86. Thus, when information is to be displayed in the GUI 100, the network processor 90 will typically retrieve data from both the local database 94 for static information, and the network database 86 for dynamic information.

Figure 11:
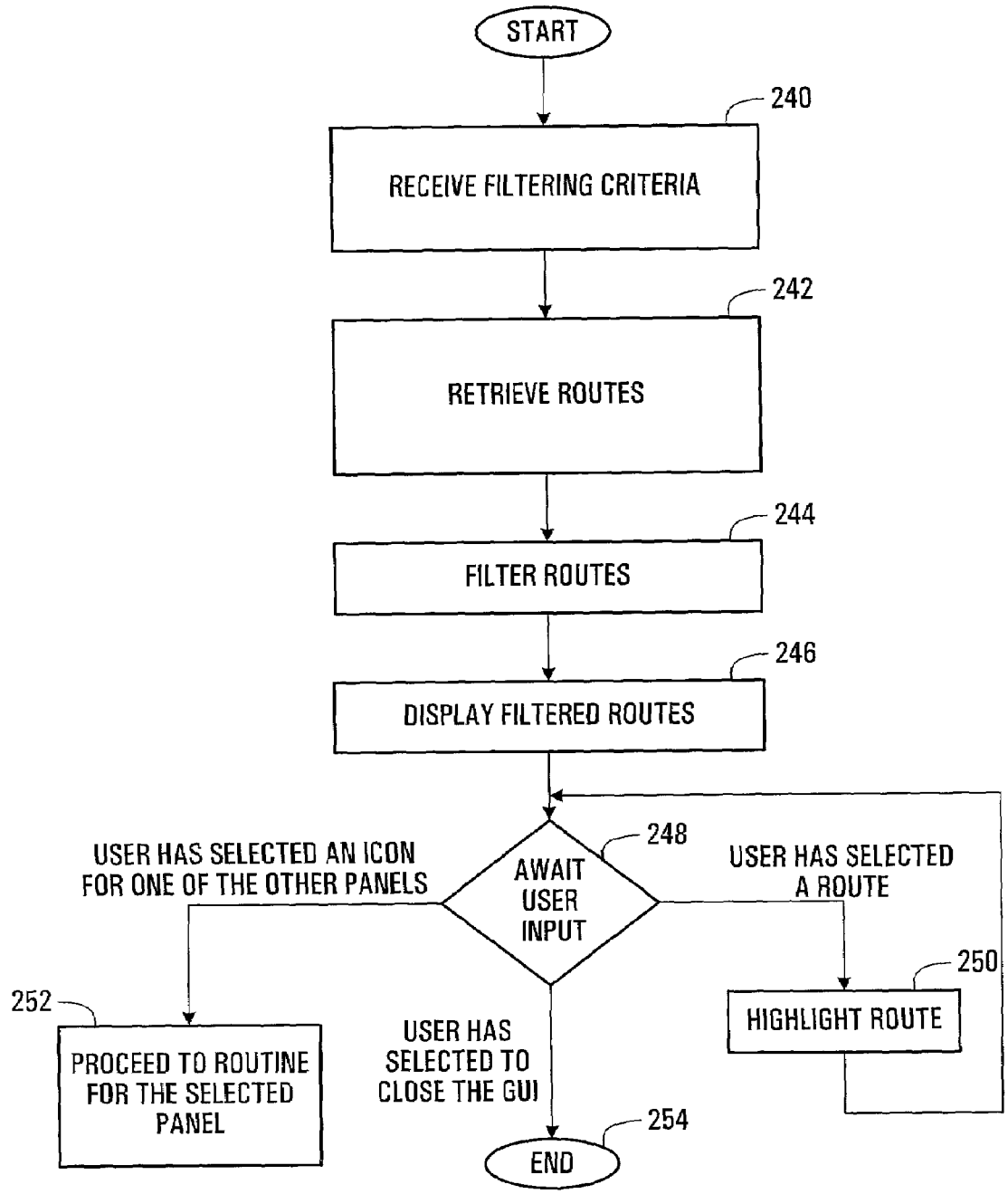
FIG. 11 is a flow chart for how the GUI of FIG. 4 displays a routes panel.

FIG. 11 shows a flow chart for the display of the routes panel 102 in the GUI 100. First, the network administrator provides the GUI 100 with filtering criteria for the routes to be displayed in the routes panel. As discussed earlier, such filtering criteria may include the start node for the routes to be displayed, the end node for routes to be displayed, a given node which is included in the routes to be displayed, a given link which is included in the routes to be displayed, etc. Once such filtering criteria are received 240, a list of routes and their characteristics is retrieved 242 from the local database 94 and the network database 86. These routes are then filtered 244 using the filtering criteria received from the network administrator, and the resulting routes and information associated therewith are displayed 246 in the routes panel 102. The GUI 100 then awaits 248 further input from the network administrator. If the network administrator selects one of the routes displayed in the routes panel 102, then the selected route is highlighted 250, and the GUI 100 returns to wait 248 for further input from the network administrator. Alternatively, if the network administrator selects an icon for one of the other panels, then the GUI 100 proceeds 252 to the process associated with the selected panel, as discussed in greater detail below. Alternatively, if the network administrator chooses to close the GUI 100, then the process ends.

Figure 12:
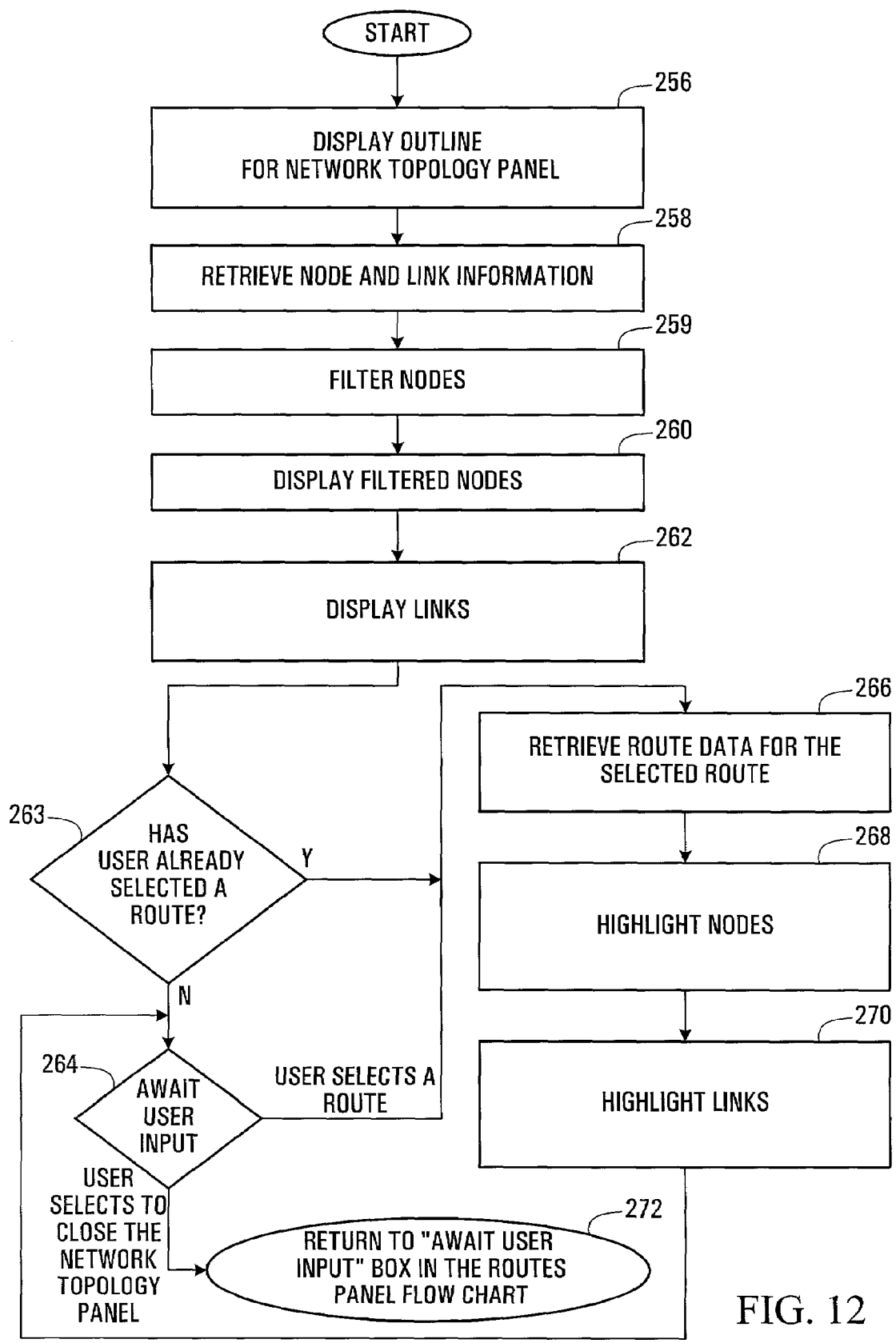
FIG. 12 is a flow chart for how the GUI of FIG. 4 displays and maintains a network topology panel.

FIG. 12 shows a flow chart for the display of the network topology panel 104. First, the outline for the network topology panel is displayed 256. The GUI 100 then retrieves 258 from the local database 94 and the network database 86, node and link information for the nodes and links which form the optical network. Included in the node information is an indication of whether the node is one at which a channel signal may be added to or dropped from a muxed signal travelling across the node. Those nodes at which a channel signal cannot be added or dropped from a muxed signal are then filtered out 259. The GUI 100 then displays 260 node dots for the filtered nodes, and also displays 262 link lines for the links which connect these nodes. If the network administrator has already selected 263 a selected route in the routes panel prior to opening the network topology panel 104, or if the network administrator subsequently selects 264 a route in the routes panel, then the GUI 100 retrieves 266 route data for the selected route from the local database 94 and the network database 86. Such route data includes an identification of whether each node on the selected route is one at which a channel signal may be added to or dropped from a muxed signal travelling across the selected route. The GUI 100 then highlights 268 those node dots representing those nodes which fit this criteria, and also highlights 270 the link lines representing the links which connect these nodes. The GUI 100 then returns to wait for further input from the network administrator. If the network administrator chooses to close the network topology panel, then the GUI 100 returns 272 to the "await user input" decision box 248 in the routes panel flow chart illustrated in FIG. 11.

Figure 13:
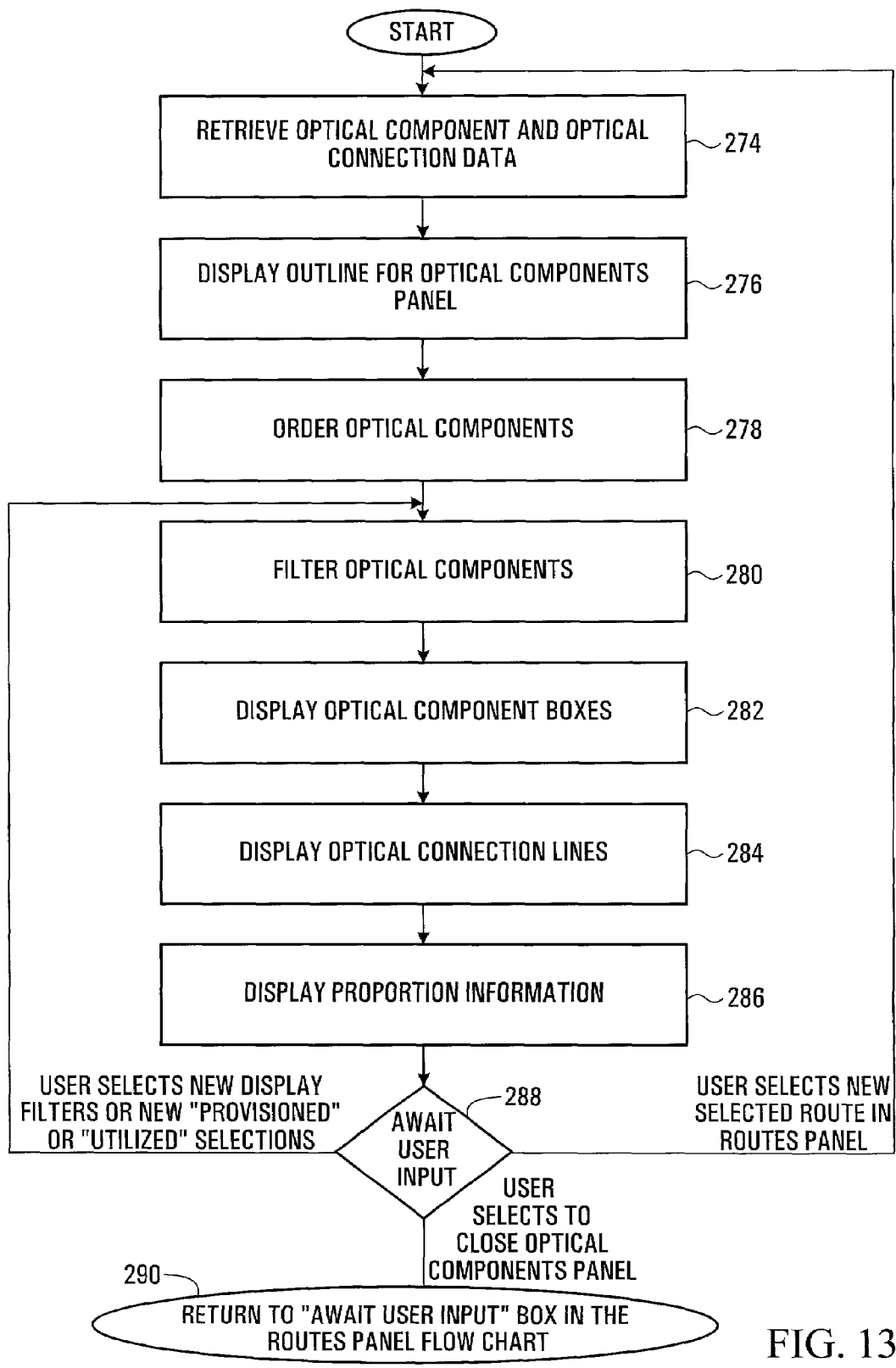
FIG. 13 is a flow chart for how the GUI of FIG. 4 displays and maintains an optical components panel.

FIG. 13 is a flow chart for the display of the optical components panel 106. First, the GUI 100 retrieves 274 optical component and optical connection data for the selected route, from the local database 94 and the network database 86. Then the outline for the optical components panel 106 is displayed 276. The GUI then orders 278 the optical components in sequential order, grouped into nodes. The user selections for the display filters 164, 166 etc. are assessed, the optical components are filtered 280 in accordance with these selections, and the optical component boxes representing the filtered optical components are displayed 282 along with the optical connection lines which connect them 284. The user selections to show "provisioned" or "utilization" proportions are assessed, and the relevant information displayed 286 in numeric and bar graph form at the top of the optical components panel 106. The GUI 100 then awaits 288 further input from the user. If the user selects a new selected route from the routes panel 102, then the process starts over. If the user selects a new set of display filters, or new selections in the "provisioned" or "utilized" boxes, the process returns to the point where the optical components are filtered 280 in accordance with the display filter selections. Finally, if the user chooses to close the network topology panel 106, the GUI 100 returns 290 to the "await user input" decision box 248 in the routes panel flow chart illustrated in FIG. 11.

Figure 14:
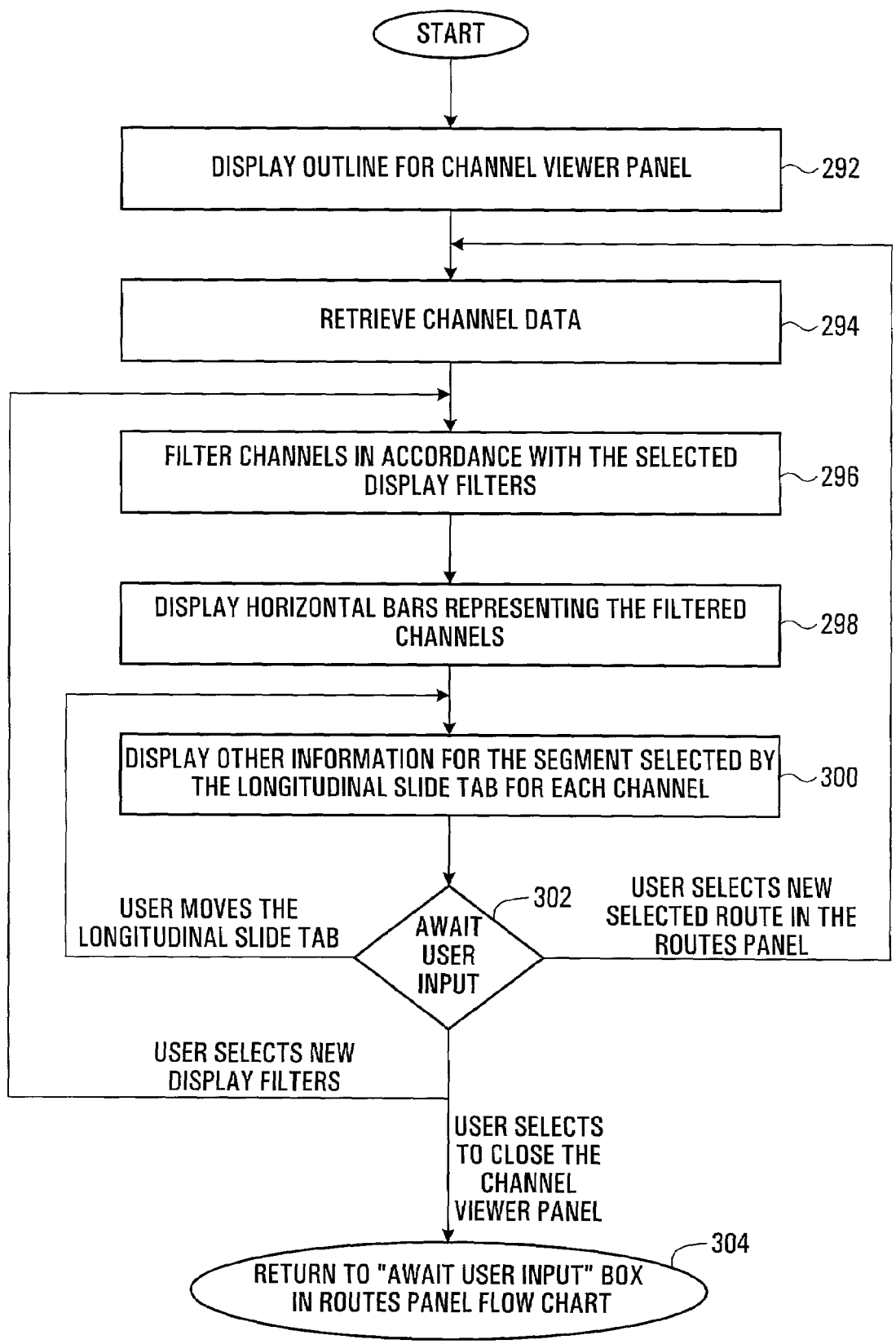
FIG. 14 is a flow chart for how the GUI of FIG. 4 displays and maintains a channel viewer panel.

FIG. 14 is a flow chart for the display of the channel viewer panel 108. The GUI 100 first displays 292 an outline for the channel viewer panel 108. Channel data for each of the links of the selected route is then retrieved 294 from the local database 94 and the network database 86. The channels are then filtered 296 in accordance with selected display filters. Channel bars 210, 212, etc. are then displayed 298 representing the filtered channels. These bars are hatched in accordance with the traffic status of the channel, as discussed above. The GUI 100 then displays 300 other information for the segment selected by the longitudinal slide tab 222, for each channel. Further input is then awaited 302. If the user selects a new selected route in the routes panel, the process returns to the step at which channel data is retrieved 294 for the links of the selected route. If the user selects new display filters, the process returns to the step at which the channels are filtered 296 in accordance with the selected display filters. If the user moves the longitudinal slide tab 222, the process returns to the step at which other information is displayed 300 for the segment selected by the longitudinal slide tab 222, for each channel. Finally, if the user chooses to close the channel viewer panel 108, the GUI 100 returns 304 to the "await user input" decision box 248 in the routes panel flow chart illustrated in FIG. 11.

Figure 15:
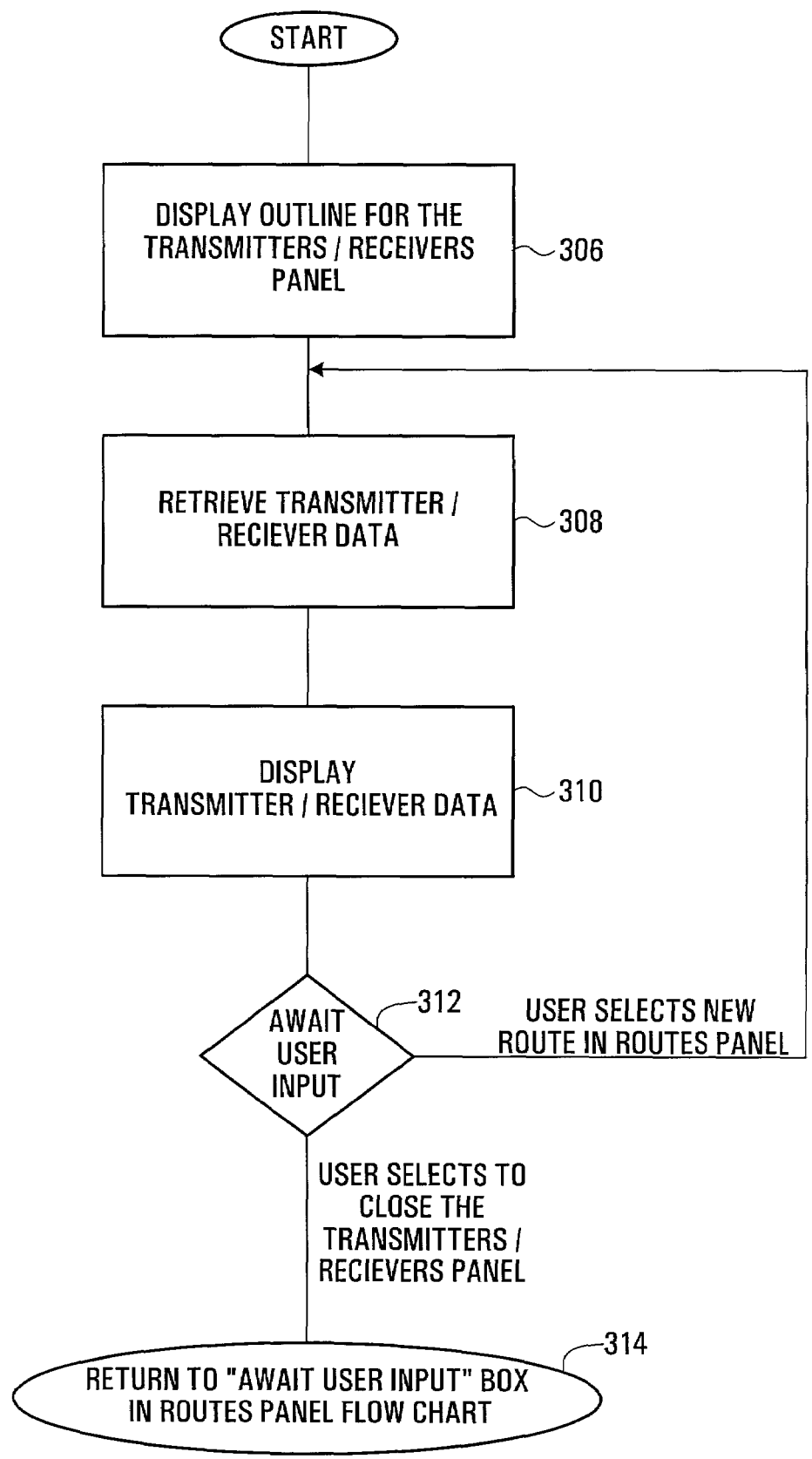
FIG. 15 is a flow chart for how the GUI of FIG. 4 displays and maintains a transmitters/receivers panel.

FIG. 15 is a flow chart for the display of the transmitters/receivers panel 109. First, an outline for the transmitters/receivers panel 109 is displayed 306. Next, transmitters/receivers data is retrieved 308 for each of the transmitters and receivers associated with each of the channels on the links of the selected route. This data is retrieved from the local database 94 and the network database 86. The transmitters/receivers data is then displayed 310 in the transmitters/receivers panel 109. The GUI 100 then awaits 312 further user input. If the user selects a new selected route in the routes panel 102, then the process returns to the step of retrieving 308 transmitters/receivers data from the databases. If the user chooses to close the transmitters/receivers panel 109, the GUI 100 returns 314 to the "await user input" decision box 248 in the routes panel flow chart illustrated in FIG. 11.

The above flow charts illustrate a very specific exemplary functionality behind the preferred embodiment GUI of the present invention. However, it is to be understood that many variations may be made to this functionality without departing from the scope of the present invention. For example, instead of requiring the user to close a given panel before viewing another panel, several panels could be open at the same time. Further, although each panel has been illustrated as being opened upon selection of an icon, it is to be understood that the opening of a panel may be effected through other means, through a pop-up menu which appears upon in-context right-clicking in another panel, for example, or through a pull-down menu in the GUI.

In the illustrated example, the panels have been displayed as display windows displayed on the display. However, it is to be understood that these panels may be other display features allowing a user to view a selected set of information, pop-up windows, or tabbed panes, for example.

It is to be understood that although the appearance of the GUI of the present invention has been described in detail with regard to the preferred embodiment GUI, it will be understood by a person skilled in the art that many variations may be made to the appearance without departing from the scope of the present invention.

It is further to be understood that the data displayed in FIGS. 4 through 10 are of course for illustrative purposes only, and that other data may be displayed in the GUI of the present invention.

Although the preferred embodiment GUI 100 has been described and illustrated as having a routes panel 102, a network topology panel 104, an optical components panel 106, a channel viewer panel 108 and a transmitters/receivers panel 109, in particular locations, it is to be understood that these panels may appear in the GUI of the present invention in any configuration, and indeed, one or more of these elements may be removed.

Additionally, it is to be noted that the present invention also contemplates a method for implementing the GUI of the present invention, a computer-readable medium having stored thereon, instructions for directing a host computer to implement the method of the present invention, as well as a computer system adapted to execute a network management application directing a network management computer to implement the method of the present invention.

Numerous modifications and variations of the present invention are possible in light of the above teachings. It is therefore to be understood that within the scope of the appended claims, the invention may be practiced otherwise than as specifically described herein. In particular, although in the foregoing description of a GUI according to an embodiment of the present invention, the functionality of, and information communicated by the GUI has been described in detail, it is to be understood that the particular functionality of the panels, the particular information displayed in each panel, and the manner in which the information is displayed may be altered without necessarily departing from the scope of the present invention which is defined in the claims which follow.

The invention claimed is:

1. A method in a computer system for displaying network management information for an optical network, said optical network comprising a plurality of nodes each comprising at least one optical component, and a plurality of links for transmitting optical signals between said plurality of nodes, said optical network further comprising at least one route of optical signal transmission, said route comprising a start node, an end node, and intermediate nodes and intermediate links through which an optical signal is transmitted between the start node and the end node on the route, wherein the intermediate links of said route are composed of a plurality of channels, and each of said channels is composed of at least one longitudinal segment, each of which longitudinal segments may be provisioned for data traffic by a network administrator, and wherein each of said optical signals is a multiplexed combination of a plurality of channel signals, each of said channel signals having associated therewith, a transmitter optical component and a receiver optical component, the method comprising:

upon selection of a network topology icon:

identifying in the plurality of nodes, add/drop nodes at which a channel signal may be added to, and/or dropped from, an optical signal on the optical network;

displaying a network topology panel; and displaying in the network topology panel, a graphical representation of only those of the plurality of nodes which have been identified as add/drop nodes;

upon selection of an optical components icon:
awaiting selection of a selected route;
upon selection of a selected route, identifying the start node, at least one intermediate node, and the end node, of which the selected route is comprised;
displaying an optical components panel; and
displaying in the optical components panel graphical representations of at least one optical component of which the start node is comprised, at least one optical component of which the at least one intermediate node is comprised, and at least one optical component of which the end node is comprised, as identified for the selected route;

upon selection of a channel viewer icon:
awaiting selection of a selected route;
upon selection of a selected route, identifying each of the plurality of channels of which the links of the selected route are comprised;
displaying a channel viewer panel;
displaying in the channel viewer panel, a graphical representation of each of the plurality of channels identified for the selected route; and
communicating in association with each of the graphical representations of the channels, which of the longitudinal segments of which the channel is comprised, has been provisioned for data traffic by the network administrator; and upon selection of a transmitters/receivers icon:
awaiting selection of a selected route;
upon selection of a selected route, identifying information respecting the transmitter optical component and receiver optical component associated with the channel signal transmitted by each of the channels of which the links of the selected route are composed;
displaying a transmitters/receivers panel; and
displaying in tabular form in the transmitters/receivers panel, the information respecting each of the transmitter optical components and the receiver optical components identified for the selected route.

2. The method of claim 1 further comprising:
when the network topology icon has been selected, displaying in the network topology panel, a graphical representation of those of the plurality of links which transmit optical signals between the add/drop nodes.

3. The method of claim 2 further comprising:
when the network topology icon and a selected route have been selected, visually distinguishing in the network topology, the graphical representations of the start node, the end node, those of the intermediate nodes at which a channel signal may be added to and/or dropped from an optical signal being transmitted on the selected route, and the intermediate links, of which the selected route is comprised.

4. The method of claim 1 wherein when the optical components icon has been selected, the graphical representations of the optical components are displayed in a linear configuration, in a sequential order.

5. The method of claim 1 further comprising:
when the optical components icon has been selected, visually communicating in the optical components panel, a proportion of a traffic capacity of each link of which the selected route is comprised, which has been provisioned for data traffic by a network administrator.

6. The method of claim 5 wherein the proportion of the traffic capacity of each link which has been provisioned for data traffic is visually communicated by displaying a bar graph showing the traffic capacity of the link, and the proportion of that traffic capacity which has been provisioned for data traffic.

7. The method of claim 5 further comprising:
when the optical components icon has been selected, visually communicating in the optical components panel a proportion of, the traffic capacity of each link of which the selected route is comprised, which has been provisioned for data traffic, which has been provisioned for data traffic at a selected speed.

8. The method of claim 1 wherein when the optical components icon has been selected, only graphical representations of those optical components having selected characteristics, are displayed.

9. The method of claim 1 further comprising:
when the channel viewer icon has been selected, upon selection of a longitudinal location along the selected route, displaying in association with each of the graphical representations of the channels, information respecting the longitudinal segment of the channel associated with the selected longitudinal location along the selected route, in tabular form.

10. The method of claim 9 wherein the graphical representations of the channels are parallel bars, and the selection of a longitudinal location along the selected route is effected by moving a slide tab displayed along the parallel bars.

11. A computer-readable medium having stored thereon, instructions for a computer system to display network management information for an optical network, said optical network comprising a plurality of nodes each comprising at least one optical component, and a plurality of links for transmitting optical signals between said plurality of nodes, said optical network further comprising at least one route of optical signal transmission, said route comprising a start node, an end node, and intermediate nodes and intermediate links through which an optical signal is transmitted between the start node and the end node on the route, wherein the intermediate links of said route are composed of a plurality of channels, and each of said channels is composed of at least one longitudinal segment, each of which longitudinal segments may be provisioned for data traffic by a network administrator, and wherein each of said optical signals is a multiplexed combination of a plurality of channel signals, each of said channel signals having associated therewith, a transmitter optical component and a receiver optical component, said instructions causing said computer system to:

upon selection of a network topology icon:
identify in the plurality of nodes, add/drop nodes at which a channel signal may be added to, and/or dropped from, an optical signal on the optical network;
display a network topology panel; and
display in the network topology panel, a graphical representation of only those of the plurality of nodes which have been identified as add/drop nodes;

upon selection of an optical components icon:
await selection of a selected route;
upon selection of a selected route, identify the start node, at least one intermediate node, and the end node, of which the selected route is comprised;
display an optical components panel; and
display in the optical components panel graphical representations of at least one optical component of which the start node is comprised, at least one optical component of which the at least one intermediate node is comprised, and at least one optical component of which the end node is comprised, as identified for the selected route;

upon selection of a channel viewer icon:
  await selection of a selected route;
  upon selection of a selected route, identify each of the plurality of channels of which the links of the selected route are comprised;
  display a channel viewer panel;
  display in the channel viewer panel, a graphical representation of each of the plurality of channels identified for the selected route; and
  communicate in association with each of the graphical representations of the channels, which of the longitudinal segments of which the channel is comprised, has been provisioned for data traffic by the network administrator; and upon selection of a transmitters/receivers icon:
  await selection of a selected route;
  upon selection of a selected route, identify information respecting the transmitter optical component and receiver optical component associated with the channel signal transmitted by each of the channels of which the links of the selected route are composed;
  display a transmitters/receivers panel; and
  display in tabular form in the transmitters/receivers panel, the information respecting each of the transmitter optical components and the receiver optical components identified for the selected route.

12. The computer-readable medium of claim 11 wherein said instructions further cause said computer system to:
  when the network topology icon has been selected, display in the network topology panel, a graphical representation of those of the plurality of links which transmit optical signals between the add/drop nodes.

13. The computer-readable medium of claim 12 wherein said instructions further cause said computer system to:
  when the network topology icon and a selected route have been selected, visually distinguish in the network topology, the graphical representations of the start node, the end node, those of the intermediate nodes at which a channel signal may be added to and/or dropped from an optical signal being transmitted on the selected route, and the intermediate links, of which the selected route is comprised.

14. The computer-readable medium of claim 11 wherein when the optical components icon has been selected, the instructions cause said computer system to display the graphical representations of the optical components in a linear configuration, in a sequential order.

15. The computer-readable medium of claim 11 wherein said instructions further cause said computer system to:
  when the optical components icon has been selected, visually communicate in the optical components panel, a proportion of a traffic capacity of each link of which the selected route is comprised, which has been provisioned for data traffic by a network administrator.

16. The computer-readable medium of claim 15 wherein the proportion of the traffic capacity of each link which has been provisioned for data traffic is visually communicated by displaying a bar graph showing the traffic capacity of the link, and the proportion of that traffic capacity which has been provisioned for data traffic.

17. The computer-readable medium of claim 15 wherein said instructions further cause said computer system to:
  when the optical components icon has been selected, visually communicate in the optical components panel a proportion of, the traffic capacity of each link which has been provisioned for data traffic, which has been provisioned for data traffic at a selected speed.

18. The computer-readable medium of claim 11 wherein when the optical components icon has been selected, the instructions cause the computer system to display only graphical representations of those optical components having selected characteristics.

19. The computer-readable medium or claim 11 wherein said instructions her cause the computer system to:
  when the channel viewer icon has been selected, upon selection of a longitudinal location along the selected route, display in association with each of the graphical representations of the channels, information respecting the longitudinal segment of the channel associated with the selected longitudinal location along the selected route, in tabular form.

20. The computer-readable medium of claim 19 wherein the graphical representations of the channels are parallel bars, and the selection of a longitudinal location along the selected route is effected by moving a slide tab displayed along the parallel bars.

21. A network management computer system for displaying network management information for an optical network, said optical network comprising a plurality of nodes each comprising at least one optical component, and a plurality of links for transmitting optical signals between said plurality of nodes, said optical network further comprising at least one route of optical signal transmission, said route comprising a start node, an end node, and intermediate nodes and intermediate links through which an optical signal is transmitted between the start node and the end node on the route, wherein the intermediate links of said route are composed of a plurality of channels, and each of said channels is composed of at least one longitudinal segment, each of which longitudinal segments may be provisioned for data traffic by a network administrator, and wherein each of said optical signals is a multiplexed combination of a plurality of channel signals, each of said channel signals having associated therewith, a transmitter optical component and a receiver optical component, said computer system comprising:

a network database containing therein network information for the optical network;
  a processor connected to said network database operable to retrieve network information from the network database;
  a display connected to said processor for displaying network information;
  network topology display means associated with said processor operable to cause the processor to:
  retrieve from the network database, network information for the nodes;
  identify in the network information for the nodes, add/drop nodes at which a channel signal may be added to, and/or dropped from, an optical signal on the optical network;
  display on the display, a network topology panel; and
  display in the network topology panel, a graphical representation of only those of the plurality of nodes which have been identified as add/drop nodes;

optical components display means associated with said
   processor operable to cause the processor to:
await selection of a selected route;
upon selection of a selected route, retrieve network information for the selected route from the network database;
identify in the network information for the selected route, the start node, at least one intermediate node, and the end node, of which the selected route is comprised;
display on the display, an optical components panel; and
display in the optical components panel graphical representations of at least one optical component of which the start node is comprised, at least one optical component of which the at least one intermediate node is comprised, and at least one optical component of which the end node is comprised, as identified for the selected route;
channel viewer display means associated with said processor operable to cause the processor to:
await selection of a selected route;
upon selection of a selected route, retrieve network information for the selected route from the network database;
identify in the network information for the selected route, each of the plurality of channels of which the links of the selected route are comprised;
display on the display a channel viewer panel;
display in the channel viewer panel, a graphical representation of each of the plurality of channels identified for the selected route; and
communicate in association with each of the graphical representations of the channels, which of the longitudinal segments of which the channel is comprised, has been provisioned for data traffic by the network administrator; and
transmitters/receivers display means associated with said processor operable to cause the processor to:
await selection of a selected route;
upon selection of a selected route, retrieve from the network database, network information for the selected route;
identify in the network information for the selected route, information respecting the transmitter optical component and receiver optical component associated with the channel signal transmitted by each of the channels of which the links of the selected route are composed;
display on the display, a transmitters/receivers panel; and
display in tabular form in the transmitters/receivers panel, the information respecting each of the transmitter optical components and the receiver optical components identified for the selected route.

22. The computer system of claim 21 wherein said network topology display means is further operable to cause the processor to:
display in the network topology panel, a graphical representation of those of the plurality of links which transmit optical signals between the add/drop nodes.

23. The computer system of claim 22 wherein said network topology display means is further operable to cause the processor to:
when a selected route have been selected, visually distinguish in the network topology, the graphical representations of the start node, the end node, those of the intermediate nodes at which a channel signal may be added to and/or dropped from an optical signal being transmitted on the selected route, and the intermediate links, of which the selected route is comprised.

24. The computer system of claim 21 wherein said optical components display means is further operable to cause the processor to:
display the graphical representations of the optical components in a linear configuration, in a sequential order.

25. The computer system of claim 21 wherein said optical components display means is further operable to cause the processor to:
visually communicate in the optical components panel, a proportion of a traffic capacity of each link of which the selected route is comprised, which has been provisioned for data traffic by a network administrator.

26. The computer system of claim 25 wherein the proportion of the traffic capacity of each link which has been provisioned for data traffic is visually communicated by displaying a bar graph showing the traffic capacity of the link, and the proportion of that traffic capacity which has been provisioned for data traffic.

27. The computer system of claim 25 wherein said optical components display means is further operable to cause the processor to:
visually communicate in the optical components panel a proportion of, the traffic capacity of each link which has been provisioned for data traffic, which has been provisioned for data traffic at a selected speed.

28. The computer system of claim 21 wherein said optical components display means is further operable to cause the processor to:
display only graphical representations of those optical components having selected characteristics.

29. The computer system of claim 21 wherein said channel viewer display means is further operable to cause the processor to:
upon selection of a longitudinal location along the selected route, display in association with each of the graphical representations of the channels, information respecting the longitudinal segment of the channel associated with the selected longitudinal location along the selected route, in tabular form.

30. The computer system of claim 29 wherein the graphical representations of the channels are parallel bars, and the selection of a longitudinal location along the selected route is effected by moving a slide tab displayed along the parallel bars.

31. A method in a computer system for displaying network management information for an optical network, said optical network comprising a plurality of optical components, and a plurality of optical connections for transmitting optical signals between said plurality of optical components, said optical network further comprising at least one route of optical signal transmission, said route comprising a start optical component, an end optical component, and intermediate optical components and intermediate optical connections through which an optical signal is transmitted between the start optical component and the end optical component on the route, the method comprising:
awaiting selection of a selected route;
upon selection of a selected route, identifying the start optical component, at least one intermediate optical component, and the end optical component, of which the selected route is comprised;
displaying an optical components panel; and
displaying in the optical components panel graphical representations of each or the start optical component, the at least one intermediate component, and the end optical component identified for the selected route.

32. A method in a computer system for displaying network management information for an optical network, said optical network comprising a plurality of nodes each comprising at least one optical component, and a plurality of links for transmitting optical signals between said plurality of nodes, said optical network further comprising at least one route of optical signal transmission, said route comprising a start node, an end node, and intermediate nodes and intermediate links through which an optical signal is transmitted between the start node and the end node on the route, wherein each of said links is composed of a plurality of channels, and each of said channels is composed of at least one longitudinal segment, each of which longitudinal segments may be provisioned for data traffic by a network administrator, the method comprising:

awaiting selection of a selected route;

upon selection of a selected route, identifying each of the plurality of channels of which the links of the selected route are comprised;

displaying a channel viewer panel;

displaying in the channel viewer panel, a graphical representation of each of the plurality of channels identified for the selected route; and communicating in association with each of the graphical representations of the channels, which of the longitudinal segments of which the channel is comprised, has been provisioned for data traffic by the network administrator.

33. A method in a computer system for displaying network management information for an optical network, said optical network comprising a plurality of nodes each comprising at least one optical component, and a plurality of links for transmitting optical signals between said plurality of nodes, said optical network further comprising at least one route of optical signal transmission, said route comprising a start node, an end node, and intermediate nodes and intermediate links through which an optical signal is transmitted between the start node and the end node on the route, wherein each of said links is composed of a plurality of channels, each of said channels being capable of transmitting a channel signal, each of said channel signals having associated therewith, a transmitter optical component and a receiver optical component, the method comprising:

awaiting selection of a selected route;

upon selection of a selected route, identifying information respecting the transmitter optical component and receiver optical component associated with the channel signal transmitted by each of the channels of which the links of the selected route are composed;

displaying a transmitters/receivers panel; and displaying in tabular form in the transmitters/receivers panel, the information respecting each of the transmitter optical components and the receiver optical components identified for the selected route.

34. A method in a computer system for displaying network management information for an optical network, said optical network comprising a plurality of nodes each comprising at least one optical component, and a plurality of links for transmitting optical signals between said plurality of nodes, said optical network further comprising at least one route of optical signal transmission, said route comprising a start node, an end node, and intermediate nodes and intermediate links through which an optical signal is transmitted between the start node and the end node on the route, the method comprising:

upon selection of a selected node, displaying in tabular form in a routes panel, information respecting each route which includes the selected node.

35. A method in a computer system for displaying network management information for an optical network, said optical network comprising a plurality of nodes each comprising at least one optical component, and a plurality of links for transmitting optical signals between said plurality of nodes, said optical network further comprising at least one route of optical signal transmission, said route comprising a start node, an end node, and intermediate nodes and intermediate links through which an optical signal is transmitted between the start node and the end node on the route, said method comprising:

upon selection of a selected link, displaying in a tabular form in a routes panel, information respecting each route which includes the selected link.

* * * * *